United States Patent
Teller et al.

(10) Patent No.: US 9,329,767 B1
(45) Date of Patent: May 3, 2016

(54) USER-SPECIFIC CUSTOMIZATION BASED ON CHARACTERISTICS OF USER-INTERACTION

(75) Inventors: Eric Teller, San Francisco, CA (US); Martin T. King, late of, Vashon Island, WA (US); Cheryl Grunbock, legal representative, Vashon Island, WA (US); Claes-Fredrik Mannby, Mercer Island, WA (US); Kevin Anthony Furr, Vashon, WA (US)

(73) Assignee: Google Inc., Mountain View, CA (US)

( * ) Notice: Subject to any disclaimer, the term of this patent is extended or adjusted under 35 U.S.C. 154(b) by 897 days.

(21) Appl. No.: 13/156,001

(22) Filed: Jun. 8, 2011
(Under 37 CFR 1.47)

Related U.S. Application Data

(60) Provisional application No. 61/352,787, filed on Jun. 8, 2010, provisional application No. 61/352,784, filed on Jun. 8, 2010, provisional application No. 61/352,783, filed on Jun. 8, 2010, provisional application No. 61/352,730, filed on Jun. 8, 2010, provisional application No. 61/352,721, filed on Jun. 8, 2010.

(51) Int. Cl.
*G06F 3/0488* (2013.01)
*G06F 3/0354* (2013.01)

(52) U.S. Cl.
CPC .......... *G06F 3/0488* (2013.01); *G06F 3/04883* (2013.01); *G06F 3/03545* (2013.01)

(58) Field of Classification Search
CPC ...... G06F 3/0488; G06F 3/04883; G06F 3/03545
USPC .................................. 345/173, 179
See application file for complete search history.

(56) References Cited

U.S. PATENT DOCUMENTS

| | | | |
|---|---|---|---|
| 8,452,978 B2 | 5/2013 | Alward et al. | |
| 2003/0011574 A1* | 1/2003 | Goodman | 345/172 |
| 2003/0117365 A1* | 6/2003 | Shteyn | 345/156 |
| 2006/0109262 A1* | 5/2006 | Yeh | 345/179 |
| 2007/0030257 A1* | 2/2007 | Bhogal et al. | 345/179 |
| 2007/0085836 A1* | 4/2007 | Ely | 345/173 |
| 2008/0181501 A1* | 7/2008 | Faraboschi et al. | 382/179 |
| 2008/0284750 A1* | 11/2008 | Hsu et al. | 345/173 |
| 2009/0046110 A1* | 2/2009 | Sadler et al. | 345/660 |
| 2009/0085877 A1* | 4/2009 | Chang et al. | 345/173 |
| 2009/0098857 A1 | 4/2009 | DeAtley | |
| 2009/0101418 A1* | 4/2009 | Young et al. | 178/19.04 |
| 2009/0184939 A1* | 7/2009 | Wohlstadter et al. | 345/173 |
| 2009/0273563 A1* | 11/2009 | Pryor | 345/157 |
| 2010/0097324 A1* | 4/2010 | Anson et al. | 345/173 |
| 2010/0225456 A1* | 9/2010 | Eldering | 340/407.2 |
| 2011/0134026 A1* | 6/2011 | Kang et al. | 345/156 |
| 2012/0135716 A1* | 5/2012 | Katpelly et al. | 455/414.1 |

\* cited by examiner

*Primary Examiner* — Aneeta Yodichkas
(74) *Attorney, Agent, or Firm* — McDonnell Boehnen Hulbert & Berghoff LLP

(57) ABSTRACT

The disclosed methods, devices, and systems may enable the user of an input device to be identified based on characteristics of the user's input. In one aspect, an example computer-implemented method may involve: (i) receiving an input signal corresponding to a touch interaction on a touch-based interface; (ii) determining, based at least in part on the input signal, one or more characteristics of the touch interaction, where the one or more characteristics of the touch interaction include at least one behavioral characteristic of the touch interaction; (iii) using the one or more characteristics of the touch interaction as a basis for determining a user-profile; and (iv) initiating at least one action based on the determined user-profile.

51 Claims, 20 Drawing Sheets

USER-SPECIFIC CUSTOMIZATION BASED ON CHARACTERISTICS OF USER-INTERACTION

RELATED APPLICATIONS

This application claims priority to U.S. Provisional Application No. 61/352,784, entitled "VISUAL PEN TRACKING", filed Jun. 8, 2010; U.S. Provisional Application No. 61/352,730, entitled "IONIC BALLPOINT PEN", filed Jun. 8, 2010; U.S. Provisional Application No. 61/352,721, entitled "P9", filed Jun. 8, 2010; U.S. Provisional Application No. 61/352,787, entitled "MOBILE DEVICE CAMERA POSITIONING", filed Jun. 8, 2010; and U.S. Provisional Application No. 61/352,783, entitled "AUDITORY PEN TRACKING", each of which is herein incorporated by reference for all purposes.

BACKGROUND

Unless otherwise indicated herein, the materials described in this section are not prior art to the claims in this application and are not admitted to be prior art by inclusion in this section.

Writing in "longhand" can be quite cumbersome, and has not advanced much in the last millennia. Text input on computing devices, such as the T9 system for cell phones, can greatly speed up text input by use of statistical knowledge of text, and explicit shortcuts, such as assigning abbreviations to represent longer phrases.

With the use of electronics, it has become possible to analyze pen movements, and to output images on surfaces such as paper. Some systems, such as pens with mechanical, optical or electrical motion tracking systems, are able to accurately track relative motion against a surface, such as a paper, but may less accurately track absolute position and motion, especially when such pens are not in contact with the surface. Some systems, such as pens with mechanical, optical or electrical motion tracking systems, are able to accurately track relative motion against a surface, such as a paper, but may less accurately track absolute position and motion, especially when such pens are not in contact with the surface.

Use of pens and pencils to take textual and graphical notes is very convenient and ubiquitous. Paper is available in many situations, such as homes, offices, restaurants, service desks, etc. However, it has historically been very inconvenient to transfer such notes into a digital form, usable by a computing system. Cameras in laptops and cellphones are often used to capture images of users and surrounding objects, but usually not a surface that a user is interacting with, such as a keyboard or a paper.

In general, computing systems such as personal computers, laptop computers, tablet computers, and cellular phones, among many other types of Internet-capable computing systems, are increasingly prevalent in numerous aspects of modern life. As computing systems become progressively more integrated with users' everyday life, the convenience, efficiency, and intuitiveness of the manner in which users interact with the computing systems becomes progressively more important.

Some recent attempts to improve the manner in which users interface with computing systems have involved use of a touch-based interface, perhaps in combination with one or more of the devices described above. While such touch-based interfaces are becoming increasingly prevalent, to date, techniques for interacting with such touch-based interfaces are often considered inconvenient, inefficient, and/or non-intuitive by users. An improvement is therefore desired.

SUMMARY

The methods, devices, and systems described herein may enable the user of an input device to be identified based on characteristics of the user's input at a touch-based interface. Accordingly, the user's experience may then be customized. In one aspect, an example computer-implemented method may involve: (i) receiving an input signal corresponding to a touch interaction on a touch-based interface; (ii) determining, based at least in part on the input signal, one or more characteristics of the touch interaction, where the one or more characteristics of the touch interaction include at least one behavioral characteristic of the touch interaction; (iii) using the one or more characteristics of the touch interaction as a basis for determining a user-profile; and (iv) initiating at least one action based on the determined user-profile.

In another aspect, an example computer-implemented method may involve: (i) receiving an input signal corresponding to a touch interaction on a touch-based interface, where the touch interaction corresponds to a text segment; (ii) determining, based at least in part on the input signal, one or more characteristics of the text segment, wherein the one or more characteristics of the text segment include at least one semantic characteristic of the text segment; (iii) using the one or more characteristics of the text segment as a basis to determine a particular user-profile; and (iv) initiating at least one action based on the particular user-profile.

In another aspect, an example computer-implemented method may involve: (i) receiving at least one input signal corresponding to a gesture on a surface; (ii) analyzing the at least one input signal and determining one or more characteristics of the gesture, where the one or more characteristics of the gesture comprise at least one behavioral characteristic of the gesture; (iii) using the one or more characteristics of the gesture as a basis to determine a user-profile; and (iv) initiating at least one action based on the determined user-profile.

In another aspect, an example computer-implemented method may involve: (i) at each of a plurality of instances: (a) detecting, at a computing device having a touch-based interface, a touch interaction on the touch-based interface; (b) determining that a first user-profile is associated with the touch interaction; (c) determining a value at the instance of at least one setting of the computing device; (d) determining a context at the instance; and (e) generating and storing a data entry for the instance, wherein the data entry is associated with the first user-profile and includes an indication of the value at the instance of the at least one setting of the computing device and an indication of the context at the instance; (ii) analyzing the data entries for the first user-profile and determining that a correlation exists between a particular value of at least one setting of the computing device and a particular context; and (iii) responsive to determining that the correlation exists, creating a user-profile rule for the first user-profile that indicates an adjustment of the at least one setting to the particular value in response to detecting that a current context substantially matches the particular context.

In another aspect, an example system may include a non-transitory computer-readable medium and program instructions stored on the non-transitory computer-readable medium and executable by the processor to: (a) receive an input signal corresponding to a touch interaction on a touch-based interface; (b) determine, based on the input signal, one or more characteristics of the touch interaction, where the one or more characteristics of the touch interaction include at least one behavioral characteristic of the touch interaction; (c) use the one or more characteristics of the touch interaction as a basis to determine a user-profile; and (d) use the determined user-profile as a basis to initiate at least one action.

These as well as other aspects, advantages, and alternatives, will become apparent to those of ordinary skill in the art by reading the following detailed description, with reference where appropriate to the accompanying drawings.

DETAILED DESCRIPTION

Figure 1:
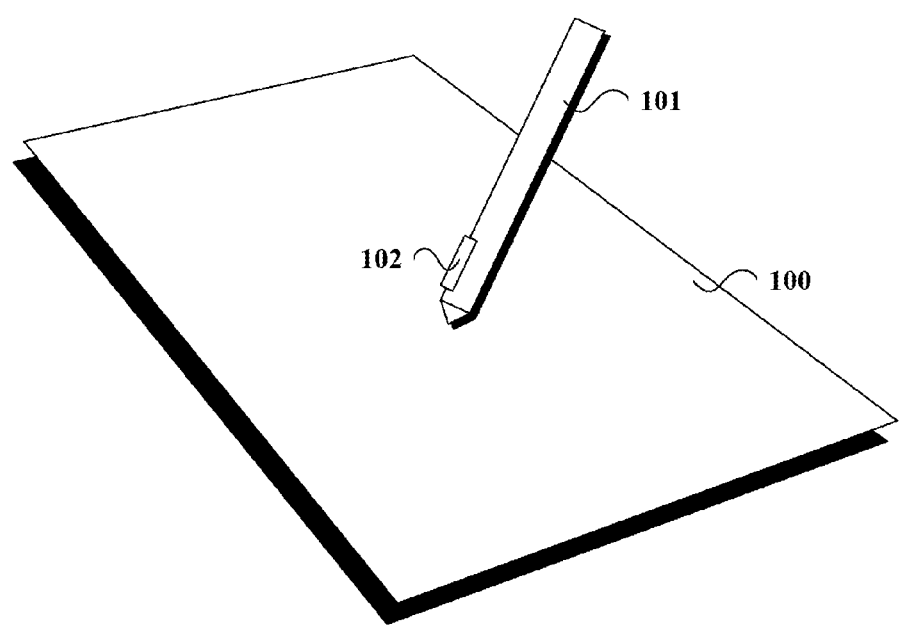
FIG. 1 shows an example input pen and surface.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting.

1. EXAMPLE PEN-INPUT DEVICE AND METHODS

A system and method for using abbreviated and/or predicted gestures, especially pen gestures, to output fuller information, such as text and graphics, are described. In some embodiments, a pen capable of detection of absolute or relative positions and motion is used to input gestures, and the system interprets abbreviated and/or partial inputs, and outputs more accurate and/or extensive outputs automatically, e.g. using a laser on a light-sensitive surface.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

In this description, "pen" may refer to any device that could be used by a human being to make gestures or markings, such as a finger, a stick, a marker, a pencil, a pen, cell phone, a nose, a tongue, a toe, etc.

In some embodiments, a pen capable of detection of absolute or relative positions and motion is used to input gestures, and the system interprets abbreviated and/or partial inputs, and outputs more accurate and/or extensive outputs automatically, e.g. using a laser on a light-sensitive surface.

In some embodiments, a pen with an image sensor is used.
In some embodiments, a pen that senses relative motion through ionized ink is used.
In some embodiments, a pen is used in combination with an external device that tracks absolute and/or relative pen motion.
In some embodiments, the output is projected temporarily onto a surface or shown temporarily on a display.
In some embodiments, a pen renders markings on a special surface, while ink from the pen does not.
In some embodiments, physical pen markings and system-generated outputs are combined.
In some embodiments, system-generated outputs are not shown on the surface being written or drawn on with the pen.
In some embodiments, candidate completions or suggested outputs are displayed in a temporary form, on the surface, on a separate display, on the pen, are spoken, etc., and the user may choose to accept a choice, may accept the top choice, may passively allow the top choice to be used, may reject any output, may directly select outputs without gesture input, etc.

In some embodiments, permanent markings are made using then pen.

In some embodiments, permanent markings are made using a separate device, such as a cell phone, or using a special-purpose device, such as a plotter.

In some embodiments, the output is stored as data in a digital computing system.

As described herein, an exemplary system may include a pen capable of detection of absolute or relative positions and motion is used to input gestures, and the system interprets abbreviated and/or partial inputs, and outputs more accurate and/or extensive outputs automatically, e.g. using a laser on a light-sensitive surface.

Referring to FIG. 1, in some embodiments, a pen 101, is used to capture gestures against a UV-sensitive surface 100. Based on these gestures, a laser 102 etches words, graphics and images onto UV-sensitive surface 100.

Figure 2:
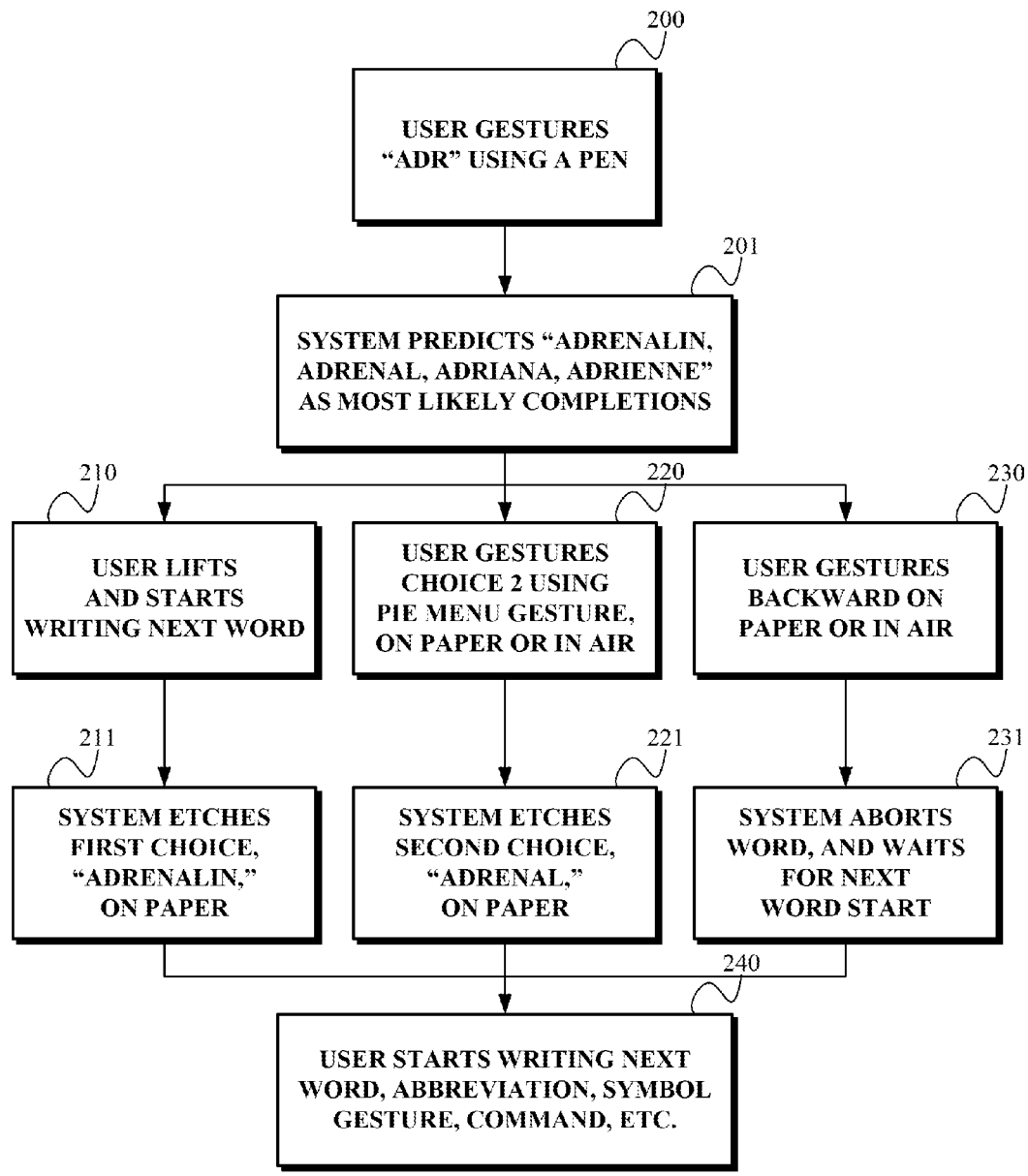
FIG. 2 shows an example pen-input method.

Referring to FIG. 2, in some embodiments, a user may use a pen to gesture letters "adr" in step 200, and the system may predict "adrenalin, adrenal, adriana, and adrienne" as the 4 most likely word completions and project these in-situ on the paper. The user may then, for example, lift the pen and move it forward slightly, indicating to the system that (s)he is ready to write the next word in step 210, and the system may etch the full first choice word, "adrenalin," on the paper in step 211. As another example, the user may use a gesture, on paper or in the air, selecting the second choice, e.g. using a gesture into a quadrant of a "pie menu," e.g. displayed on the paper, in step 220, and the system may etch the etch the full second choice word, "adrenal," on the paper in step 221. As another example, the user may gesture backward on the paper or in the air in step 230, and the system may abort the current word, and wait for the start of a new word, in step 231. In step 240, the system is ready for the next input.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of an exemplary pen-based input system is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

2. EXAMPLE PEN-TRACKING METHODS AND SYSTEMS a. Ionic Ballpoint Pen Tracking

A system and method for tracking motion of a pen are described. In some embodiments, a ball-point or roller-ball pen is used, together with ionized ink, and electrodes, to detect the relative motion of the pen against a surface, such as a paper surface. In some embodiments, additional sensors, such as accelerometers, are used to track relative motion when the pen is not moving against the surface.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a ball-point or roller-ball pen is used, together with ionized ink, and electrodes, to detect the relative motion of the pen against a surface, such as a paper surface. In some embodiments, additional sensors, such as accelerometers, are used to track relative motion when the pen is not moving against the surface.

In some embodiments, motion of the pen against a surface is measured by measuring the electrical charge passing over 3 equally spaced electrodes around a ball in the tip of the pen. The direction and amount of motion is calculated based on the amount of charge passing through each electrode. The electrode with the most charge will, in general, be closest to the direction of motion, and the amount of motion will, in general, be correlated with the amount of ink flowing past the electrodes.

In some embodiments, an accelerometer is used to track relative motion when the pen is not tracking motion against a surface.

In some embodiments, the pen has additional electronic features, such as pressure sensors, buttons, microphones, speakers, cameras, etc.

In some embodiments, the motion and other data are recorded in computer memory in the pen.

In some embodiments, the motion and other data are processed in the pen.

In some embodiments, the motion and other data, as well as analyzed data, are stored, transmitted, streamed, compressed, etc. on the pen.

In some embodiments, the pen has a wireless and/or wired communication channel, e.g. to transmit or stream data to other digital devices, such as cell phones, storage units, computers, networks, etc.

In some embodiments, the pen has a digital display.

In some embodiments, the pen uses audio input, allowing the user to record audio, give voice commands, and provide additional information, such as voice rendering of the written and/or drawn information.

In some embodiments, the pen has a projector that can project images, e.g. onto a surface such as paper.

In some embodiments, the pen has a laser, that can, for example, etch lines, dots, and other images onto special surfaces that are photosensitive, such as UV-sensitive paper.

In some embodiments, invisible (or no) ink is used, such that a surface does not receive significant markings from the pen.

In some embodiments, image data collected by the pen is used to track absolute and/or relative motion against the surface.

In some embodiments, external devices, such as a cell phone, or a special-purpose device, may be used to track relative and/or absolute pen motion, and/or to display output from the pen, and/or to correlate data with the pen, to track relative and/or absolute motion.

As described herein, the system may include a ball-point or roller-ball pen used, together with ionized ink, and electrodes, to detect the relative motion of the pen against a surface, such as a paper surface. In some embodiments, additional sensors, such as accelerometers, are used to track relative motion when the pen is not moving against the surface.

Figure 3:
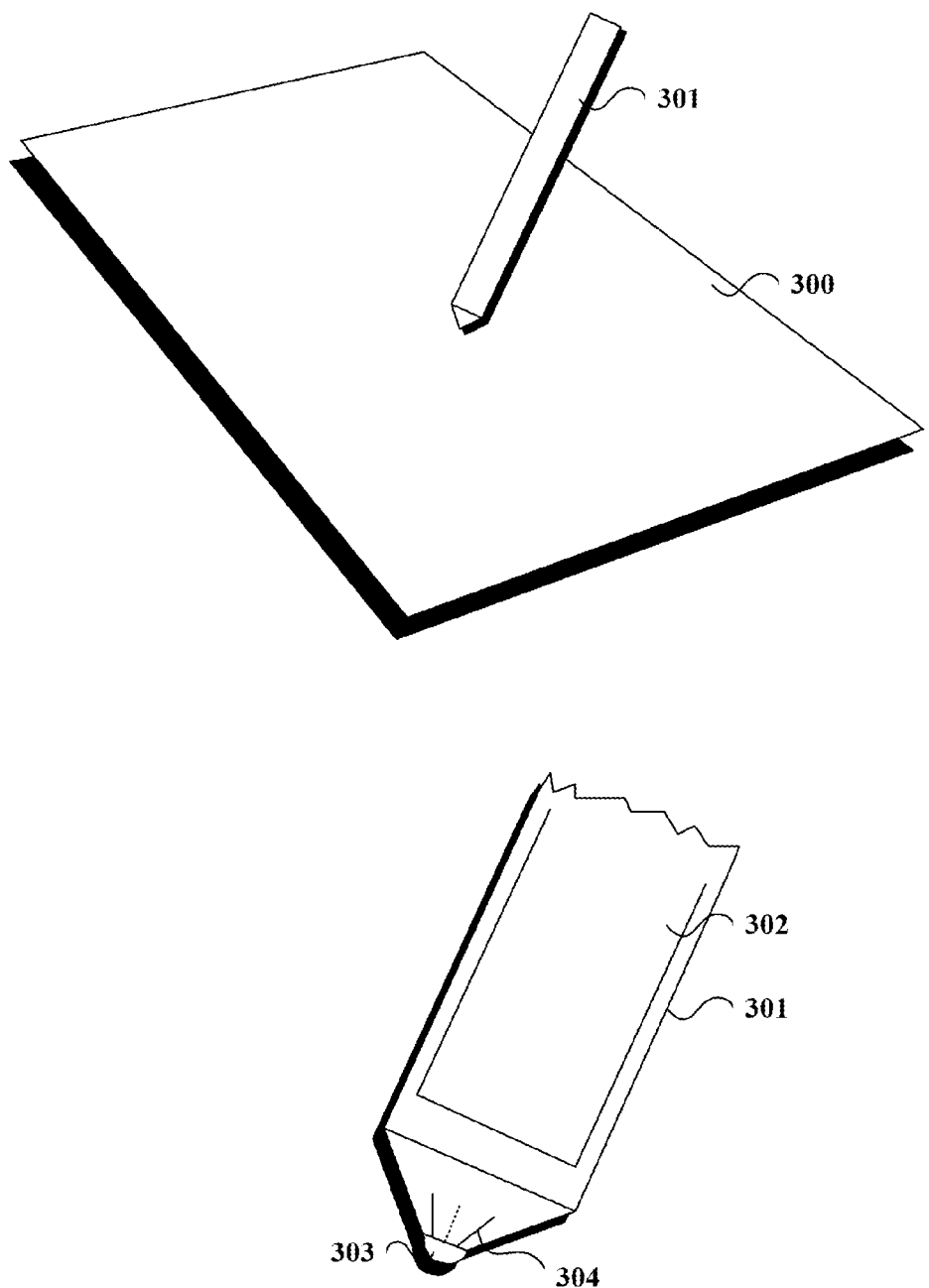
FIG. 3 shows an example ballpoint pen and surface.

Referring to FIG. 3, in some embodiments, a pen 301 is used to write on a surface 300, such as paper. The pen 301 contains ionized ink 302, that flows onto the surface by the rolling action of a ball 303 at the tip of the pen. As the ink flows out of the pen 301 close to electrodes 304, current is generated in the electrodes. Depending on the direction of motion of the pen and the ball, different amounts of current are generated in the electrodes, which can be used to calculate the direction and amount of motion.

Figure 4:
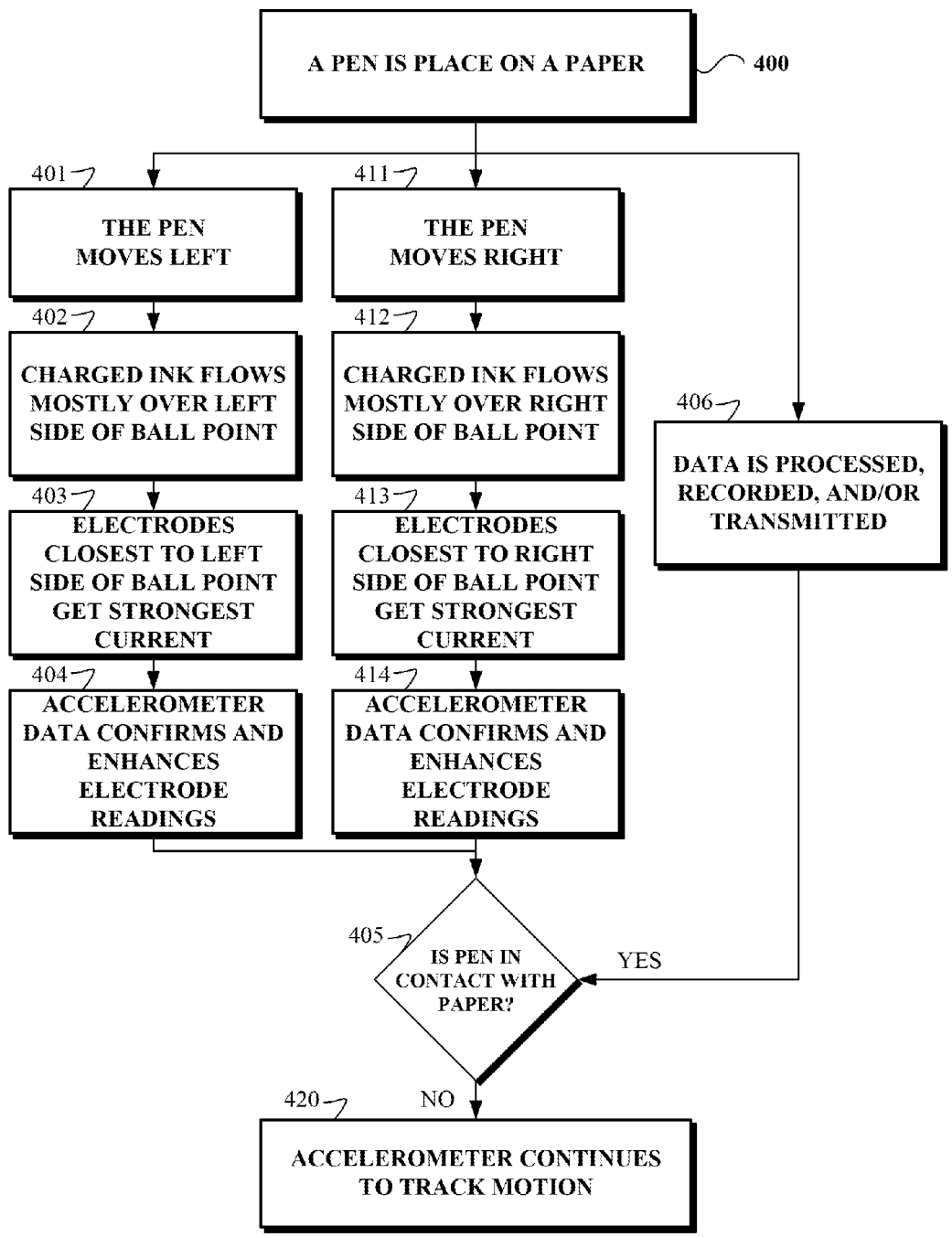
FIG. 4 shows an example ballpoint pen-tracking method.

Referring to FIG. 4, in some embodiments, a pen is placed on a surface such as paper in step 400, and depending on the direction of motion relative to the surface, e.g. left in step 401, or right, in step 411, or any other direction, charged ink flows mostly around a ball in the tip of the pen in the direction of motion, in steps 402 and 412. Electrodes, such as 3 equally spaced electrodes, receive charge based on the amount of ink flowing around the ball, which is largely based on the direction and amount of motion of the pen against the surface, in steps 403 and 413. Additional sensors, such as an accelerometer, may be used in steps 404 and 414 to confirm and enhance the electrode readings. While the pen is moving across the surface, this may continue, and data based on the various sensors may be processed, recorded and/or transmitted in step 406. When the pen is not moving against the surface, other sensors, such as accelerometers may be used in step 420 to track pen motion.

b. Auditory Pen Tracking

A system and method for using sound waves, especially surface audio waves, to track the location of objects are described. In some embodiments, a cell phone with one or more microphones is used to supplement the positioning information of a relative-motion-sensing pen with information about distance from a reference point, or locations in 2- or 3-dimensional space.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a device such as a cell phone with one or more microphones is used to supplement the positioning information of a relative-motion-sensing pen with information about distance from a reference point, or locations in 2- or 3-dimensional space.

In some embodiments, the object being tracked using sound waves does not have its own position- or motion-tracking capabilities.

In some embodiments, a single microphone is used, and only distance from the microphone is estimated.

In some embodiments, two microphones are used, and distance from the device, such as a cell phone, is estimated. In some examples, the system also identifies two possible source regions for the sound waves.

In some examples, the system assigns probabilities two each of the two possible regions based on historical data and/or in conjunction with the tracked object, and/or in conjunction with data from the tracked object.

In some embodiments, a cell phone works in conjunction with the pen device to track pen motion, e.g. using Bluetooth, infrared (IR), radio frequency (RF), Zig8ee, WiFi, etc. signals.

In some embodiments, the cell phone also serves as a user interface for the pen device.

As described herein, the system may include a cell phone with one or more microphones used to supplement the positioning information of a relative-motion-sensing pen with information about distance from a reference point, or locations in 2- or 3-dimensional space.

Figure 5:
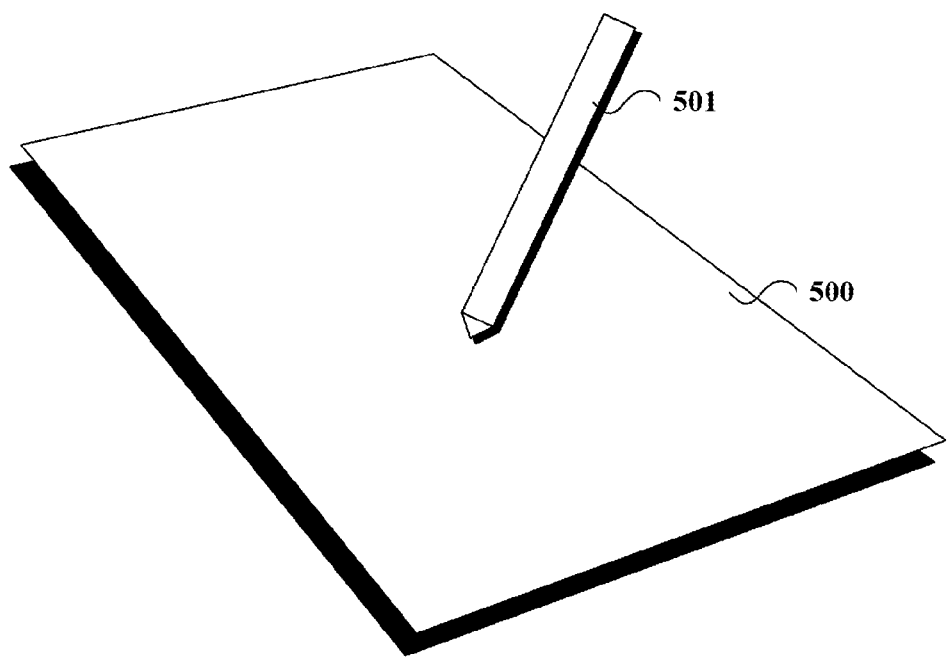
FIG. 5 shows an example input pen and surface.
Figure 5:
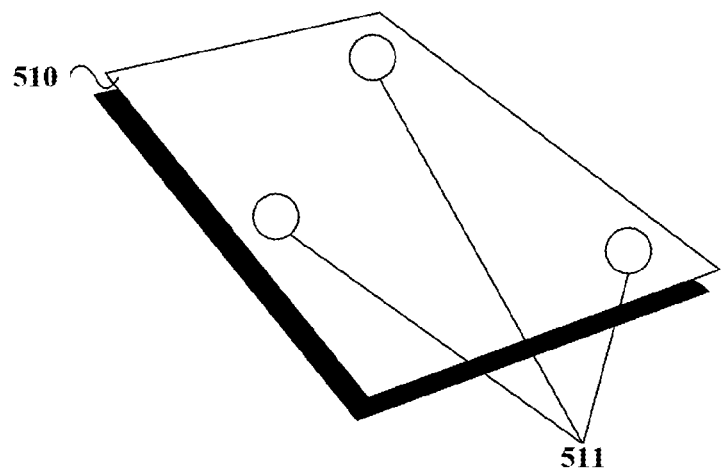

Referring to FIG. 5, in some embodiments, a pen 501, is used to capture gestures against a surface 500. A cell phone 510, with 3 microphones 511 captures sound waves, especially surface audio waves (SAW) from the pen gestures, and estimates the pen's location by triangulating the 3 estimated distances calculated from the SAWs.

As described herein, the system may include a cell phone with one or more microphones used to supplement the positioning information of a relative-motion-sensing pen with information about distance from a reference point, or locations in 2- or 3-dimensional space.

Figure 6:
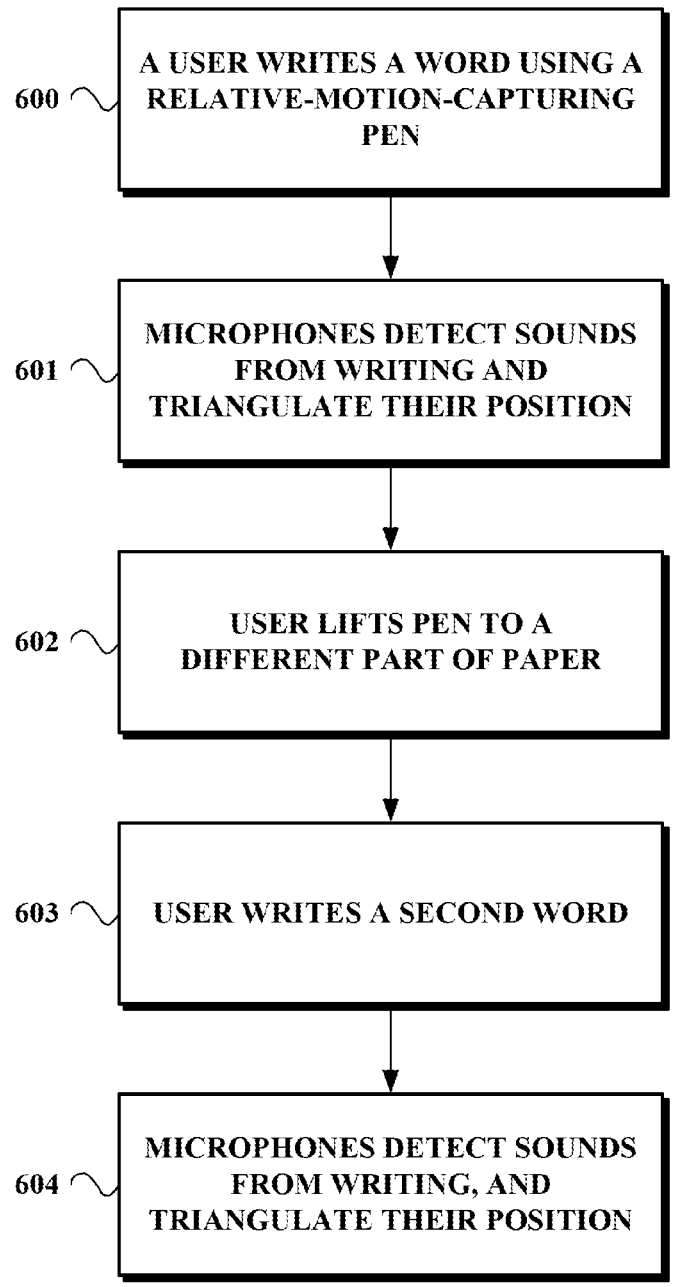
FIG. 6 shows an example auditory pen-tracking method.

Referring to FIG. 6, in some embodiments, a user may write a word using a relative-motion-capturing pen in step 600. Microphones in a cell phone detect surface audio waves from the writing, and triangulate the position of individual sounds, and average positions of sequences of sounds in step 601. In step 602, the user lifts the pen to a different part of the paper, e.g. to write the next word to the right, or to write a signature at the bottom of the page. In step 603, the user writes a second word, and in step 604 the system triangulates the position of the second word and/or parts of the second word using the surface audio waves generated by the writing of the second word.

c. Visual Pen Tracking

A system and method for using image sensors to track the location of objects are described. In some embodiments, a cell phone with one or more image sensors is used to supplement the positioning information of a relative-motion-sensing pen with information about distance from a reference point, or locations in 2- or 3-dimensional space.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network pes, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data-storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a device such as a cell phone with one or more image sensors is used to supplement the positioning information of a relative-motion-sensing pen with information about distance from a reference point, or locations in 2- or 3-dimensional space. In some embodiments, the object being tracked using images does not have its own position- or motion-tracking capabilities.

In some embodiments, the object being tracked is a simple stick or a finger.

In some embodiments, a single image sensor is used.

In some embodiments, two or more image sensors are used.

In some embodiments, a cell phone works in conjunction with the pen device to track pen motion, e.g. using Bluetooth, infrared (IR), radio frequency (RF), ZigBee, WiFi, etc. signals.

In some embodiments, the cell phone also serves as a user interface for the pen device.

In some embodiments, image sensors receive infrared light and/or visible light. In some examples, infrared light is used to distinguish a pen from a hand.

As described herein, the system may include a cell phone with one or more image sensors is used to supplement the positioning information of a relative-motion-sensing pen with information about distance from a reference point, or locations in 2- or 3-dimensional space.

Figure 7:
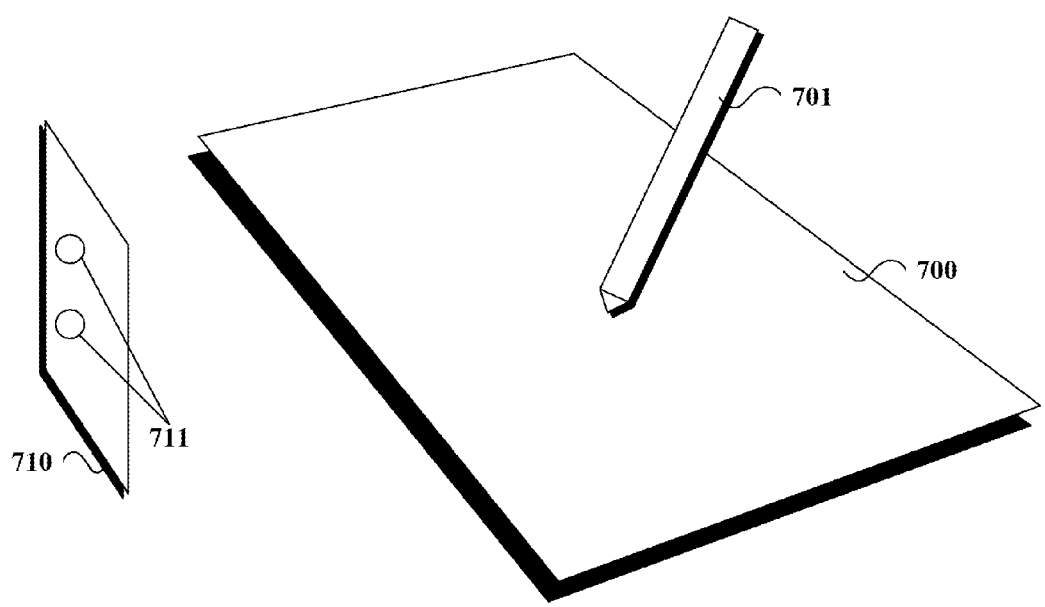
FIG. 7 shows an example input pen and surface.

Referring to FIG. 7, in some embodiments, a pen 701, is used to capture gestures against a surface 700. A cell phone 710, with 2 image sensors 711 capture images of the pen gestures, and estimates the pen's location by, for example, identifying the relative position of the surface such as a paper to the image sensors, and calculating distances from edges and other reference locations, as well as using stereoscopy to determine distance to reference points.

As described herein, the system may include a cell phone with one or more image sensors is used to supplement the positioning information of a relative-motion-sensing pen with information about distance from a reference point, or locations in 2- or 3-dimensional space.

Figure 8:
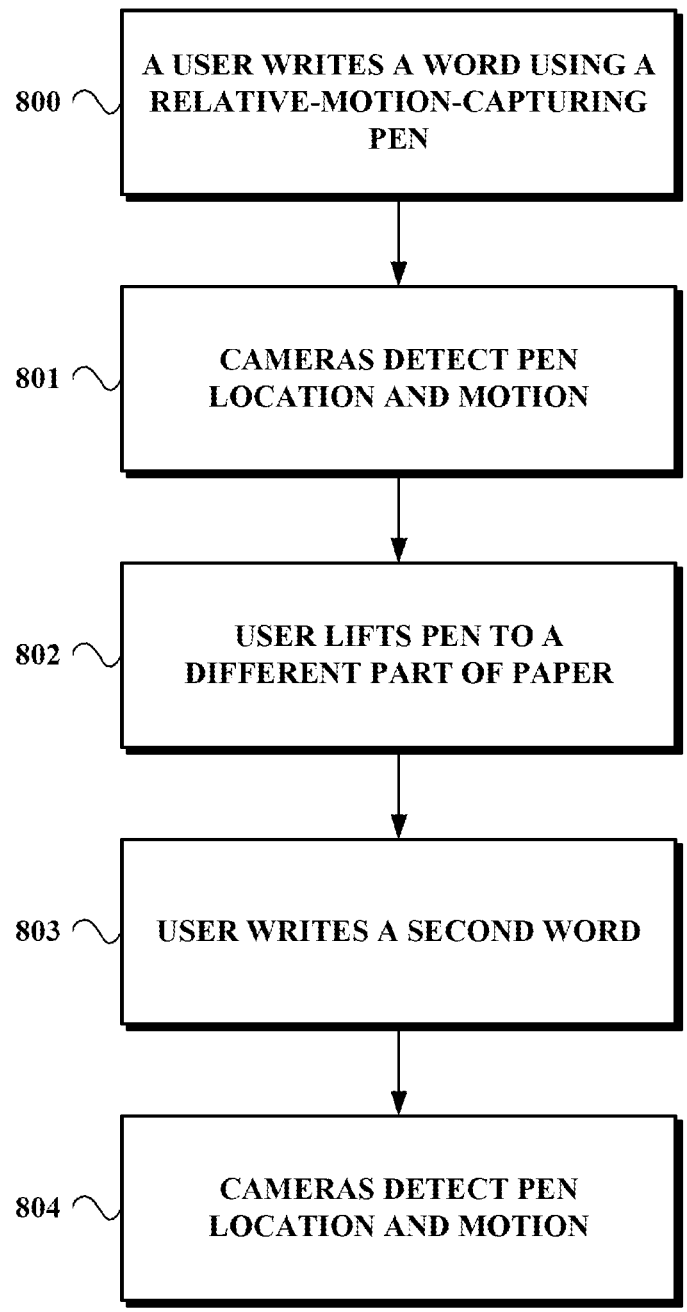
FIG. 8 shows an example visual pen-tracking method.

Referring to FIG. 8, in some embodiments, a user may write a word using a relative-motion-capturing pen in step 800. Cameras detect pen location and motion, and average pen locations in step 801. In step 802, the user lifts the pen to a different part of the paper, e.g. to write the next word to the right, or to write a signature at the bottom of the page. In step 803, the user writes a second word, and in step 804 the system calculates the position of the second word and/or parts of the second word using images of the writing of the second word.

3. MOBILE DEVICE CAMERA CONFIGURATIONS FOR PEN AND GESTURE TRACKING

A system and method for using image sensors on mobile devices to capture images of gestures and hand interactions are described. In some embodiments, a cell phone is used with a flip-out camera, a snaking camera holder, or a cell phone stand/holder.

In some embodiments, a device such as a cell phone with one or more image sensors is used to capture images of gestures and hand interactions.

In some embodiments, the cell phone has a component that can fold or be folded out to position an image sensor for a better view of a surface, such as a keyboard, paper or desk, for example, or just above such a surface.

In some embodiments, the cell phone camera has a shapeable arm with an image sensor, which can be shaped to point the image sensor at or just above a surface such as a keyboard, paper or desk.

In some embodiments, the cell phone has, or is used in conjunction with, a stand, that can be used to position the cell phone such that an image sensor is better able to capture images of a surface or the space just above a surface.

In some embodiments, an image sensor can be automatically pointed, e.g. based on image analysis, to track a hand, or motion above a surface such as a keyboard, paper, desk, etc.

As described herein, the system may include a device such as a cell phone with one or more image sensors.

Figure 9:
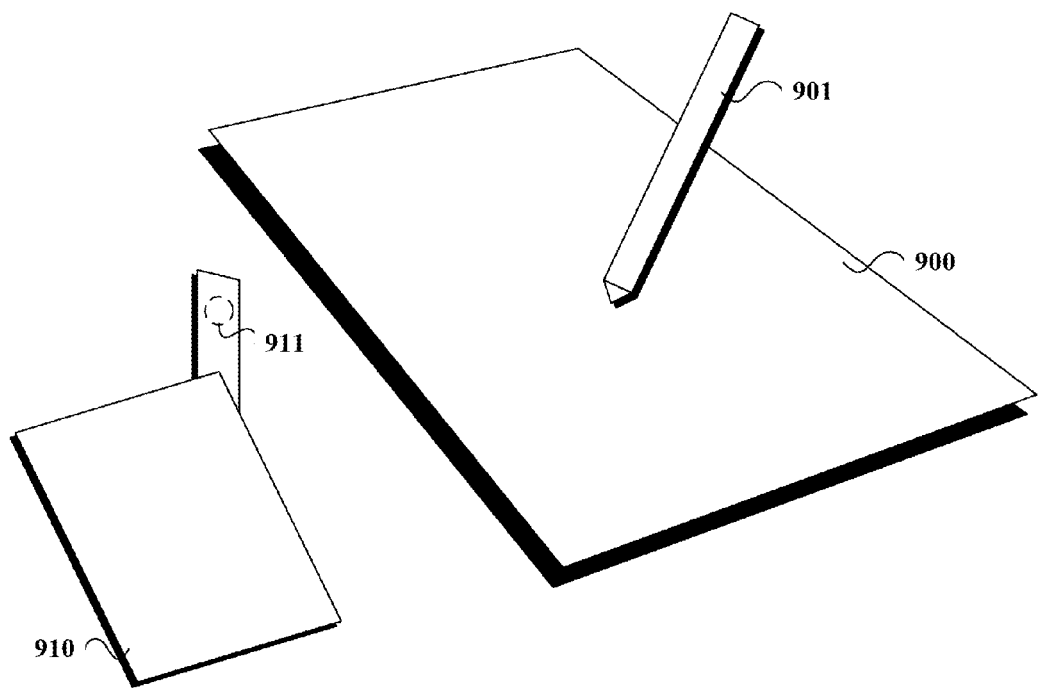
FIG. 9 shows an example input pen and surface.

Referring to FIG. 9, in some embodiments, a cell phone 910 has a flipout arm with an image sensor 911, that can be positioned to capture images of an interaction, e.g. with a pen 901, on or above a surface, such as a paper 900.

As described herein, the system may include a device such as a cell phone with one or more image sensors.

Figure 10:
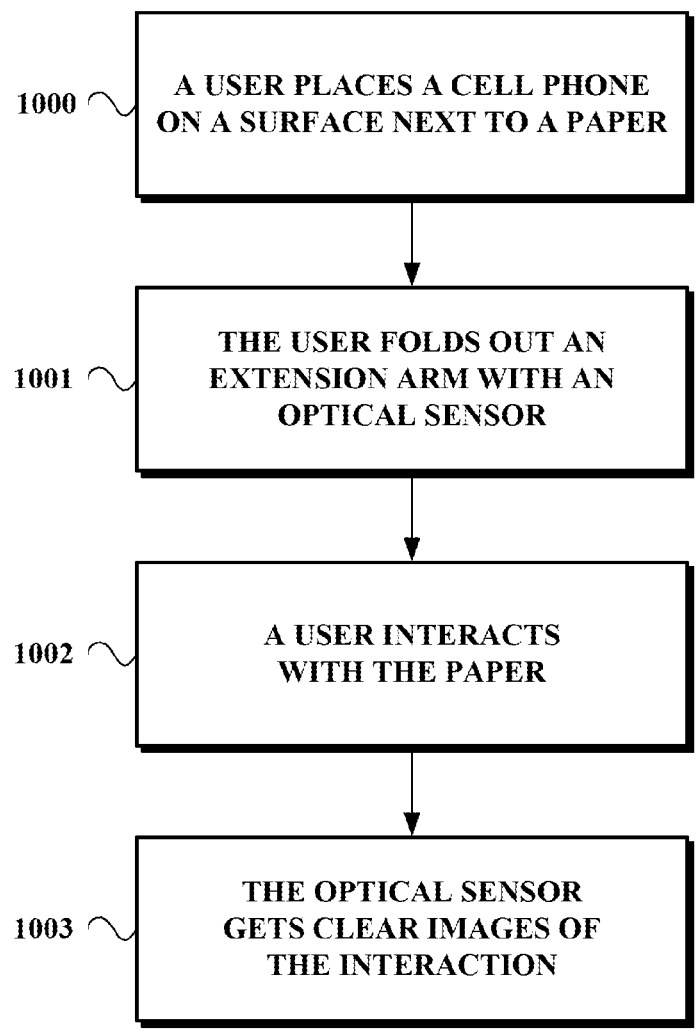
FIG. 10 shows an example pen- and/or gesture-tracking method

Referring to FIG. 10, in some embodiments, a user may place a cell phone on a surface next to a paper, in step 1000. The user folds out an extension arm with an optical sensor in step 1001. A user interacts with the paper in step 1002. The optical sensor captures images of the interaction, in step 1003.

4. OVERVIEW OF USER-SPECIFIC CUSTOMIZATION BASED ON USER-INTERACTION

Certain of the methods disclosed herein provide for user-specific customization based on characteristics of user-interaction at a touch-based interface. For example, a computing device such as a tablet computer or a smartphone may determine certain characteristics of a user's touch interaction (e.g., pressure, speed, fingerprint, grammar, vocabulary, etc.), and then identify a user-profile that corresponds to the determined characteristics. The experience provided by the computing device may then be customized according to the user-profile. For instance, a computing device may customize certain user-interfaces, customize the way user-input is interpreted, and/or customize other actions as indicated by the user's user-profile. Other examples of customization may exist as well. In this way, a computing system can provide a customized experience for a given user, based on that user's interactions with the computing system.

In some embodiments, a given user may be determined to be a particular type of user (e.g., "lawyer" or "physicist"), and settings indicated by a user-profile for that type of user may be implemented. For example, if a user is identified as a "lawyer" an error-correction scheme may be loaded that is customized for terms and phrases commonly used in preparation of legal documents.

Further, in some embodiments, the computing system may determine that a specific individual is interacting with a touch-based interface, and settings indicated by that specific individual's user-profile may be implemented. For instance, the computing system may determine the characteristics of a user's touch interaction correspond to a user-profile for a "Jane Smith." The computing system may then respond by, for example, displaying a group of "quick launch" icons, which are actionable to launch applications as indicated by the user-profile for "Jane Smith."

5. EXAMPLE DEVICES AND SYSTEMS

Exemplary computing devices and systems, which may be configured to implement exemplary methods disclosed herein, will now be described in greater detail.

a. Example Input Devices

Figure 11A:
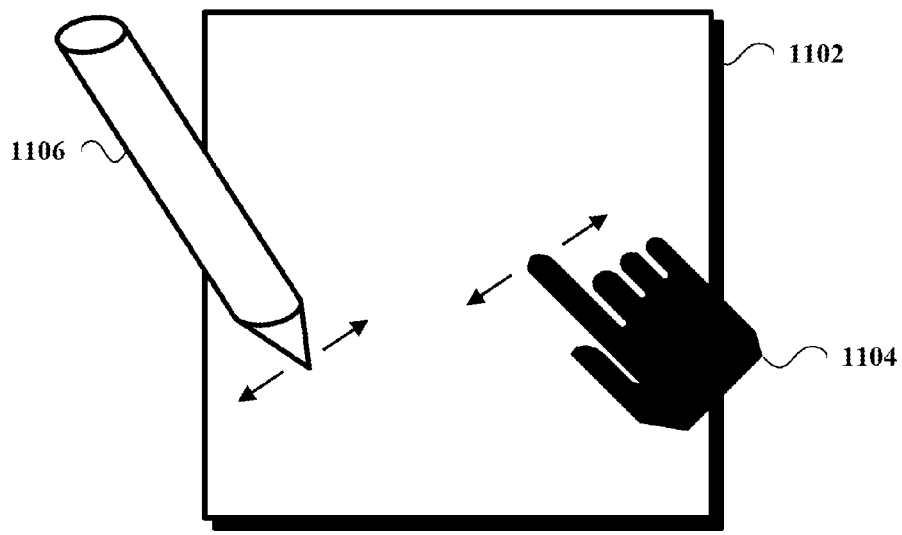
FIG. 11A shows an example touch-based interface in accordance with an example embodiment.

FIG. 11A shows an example touch-based interface 1102 in accordance with an example embodiment. A user may input data via touch-based interface 1102 using gestures. For example, as indicated by hand 1104, a user may input data by moving, swiping, pointing, and/or tapping one or more fingers on a surface of touch-based interface 1102. Other gestures may be used as well. Alternatively, a user may input data via touch-based interface 1102 using pen device 1106. For example, a user may input data by writing, moving, pointing, and/or tapping pen device 1106 on a surface of touch-based interface 1102. Other actions to input data via pen device 1106 may be used as well. Pen device 1106 may take any of the forms discussed above with respect to FIGS. 1, 3, 5, 7, and, 9. Further aspects of an example pen device are discussed below with respect to FIG. 2.

Figure 11B:
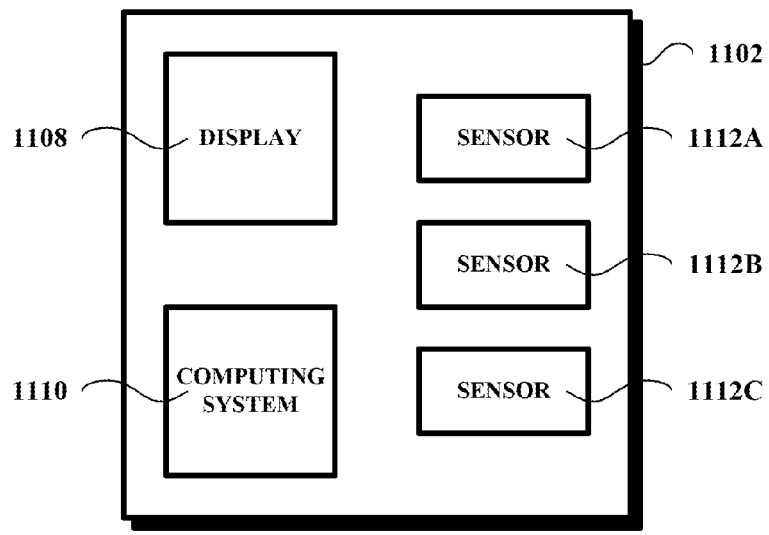
FIG. 11B shows a simplified block diagram of functional components that may be included in the example touch-based interface shown in FIG. 11A.

FIG. 11B shows a simplified block diagram of functional components that may be included in example touch-based interface 1102. In an example, touch-based interface 1102, may include on or more of a display 1108, a computing system 1110, and a variety of sensors, such as sensors 1112A-1112C. Display 108 may be a graphic display that is placed on top of, or otherwise attached to, touch-based interface 1102. For instance, display 1108 may be a graphic display that is embedded in touch-based interface 1102 (i.e., touch-based interface 1102 may be a touchscreen), such that users may interact directly with the graphic display by touching the graphic display itself.

Computing system 1110 may be any computing system configured to carry out the touch-based-interface functions described herein. Computing system 1110 may be integrated with touch-based interface 1102. Alternatively, touch-based interface 1102 may be communicatively coupled to, perhaps via a wired and/or wireless network connection, computing system 1110. Computing system 1110 may take on any suitable form, and may include various components, including any of those components described below with respect to computing system 1350 shown in FIG. 13B.

Each of sensors 1112A-1112C may be any sensor that may be used to carry out the touch-based-interface functions described herein. Although three sensors are shown in FIG. 11B, it should be understood that touch-based interface 1102 may include any number of sensors, including more, or less, sensors than sensors 1112A-1112C. For purposes of example and explanation only, any of sensors 1112A-1112C may include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others.

Touch-based interface 1102 may include multi-touch sensing capabilities. Touch-based interface 1102 may implement any one or more touch-sensing technologies including, but not limited to, bending-wave touch, dispersive-signal touch (DST), in-cell, infrared touch (IR), optical-touch technology (including, e.g., near-field imaging (NFI) and/or optical imaging), projected-capacitive touch (PST), resistive touch, surface-acoustic-wave touch (SAW), surface-capacitive touch, and/or other touch-sensing technologies now known or later developed.

Figure 12:
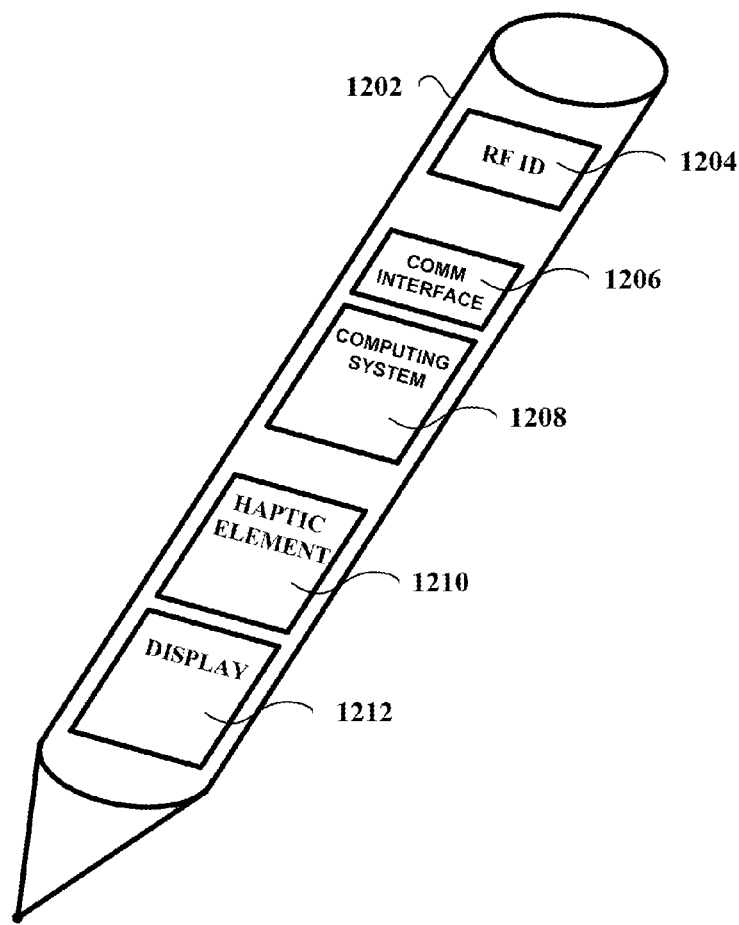
FIG. 12 shows a simplified block diagram of functional components that may be included in an example pen device in accordance with an example embodiment.

FIG. 12 shows a simplified block diagram of functional components that may be included in an example pen device 1202 in accordance with an example embodiment. As shown, example pen device 1202 includes a radio-frequency identification (RFID) circuit 1204, a communication interface 1206, a computing system 1208, a haptic element 1210, and a display 1212. It should be understood that the functional components shown in FIG. 12 are only examples of functional components that example pen device 1202 may include, and that less then, or more than, those functional components shown may be included in example pen device 1202.

RFID 1204 may be any passive or active circuitry arranged to transmit information that identifies pen device 1202. For example, RFID 1204 may include an antenna for receiving and transmitting such information. RFID 1204 may be arranged to communicate an identification of pen device 1202 to touch-based interface 1102, perhaps by way of computing system 1110. RFID 1204 may be arranged to communicate an identification of pen device 1202 to any other computing system, wireless receiver, or other device configured to receive such information. Further, although reference is made herein to an RFID tag, any suitable near-field communication (NFC) technology may be used as well or instead.

RFID 1204 may be separate from, or integrated with, communication interface 1206. Communication interface 1206 may be a wired interface. Alternatively, communication interface 1206 may include one or more antennas, chipsets, and/or other components for communicating with computing systems and/or other devices, such as computing system 1110, over an air interface. Communication interface 1206 may be arranged to communicate according to one or more communication protocols such as Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, and/or any communication protocol now known or later developed.

Communication interface 1206 may be separate from, or integrated with, computing system 1208. Computing system 1208 may be any computing system configured to carry out the pen-device functions described herein. Computing system 1208 may be integrated with pen device 1202. Alternatively, pen device 1202 may be communicatively coupled to, perhaps via a wired and/or wireless network connection, computing system 1208. Computing system 1208 may take on any suitable form, and may include various components, including any of those components described below with respect to computing system 1350 shown in FIG. 13B.

Haptic element 1210 may include any tactile-feedback technology arranged to apply forces, vibrations, and/or motions to the user at the user's point of interaction with pen device 1202. Such feedback may be provided in response to user inputs. Pen device 1202 may include other feedback elements including, but not limited to auditory feedback elements (e.g., a speaker) and/or visual feedback elements (e.g., a graphic display, such as display 1212).

Display 1212 may be a graphic display that is placed on top of, or otherwise attached to, pen device 1202. For instance, display 1212 may be a graphic display that is embedded in pen device 1202.

b. Example Computing Systems

Figure 13A:
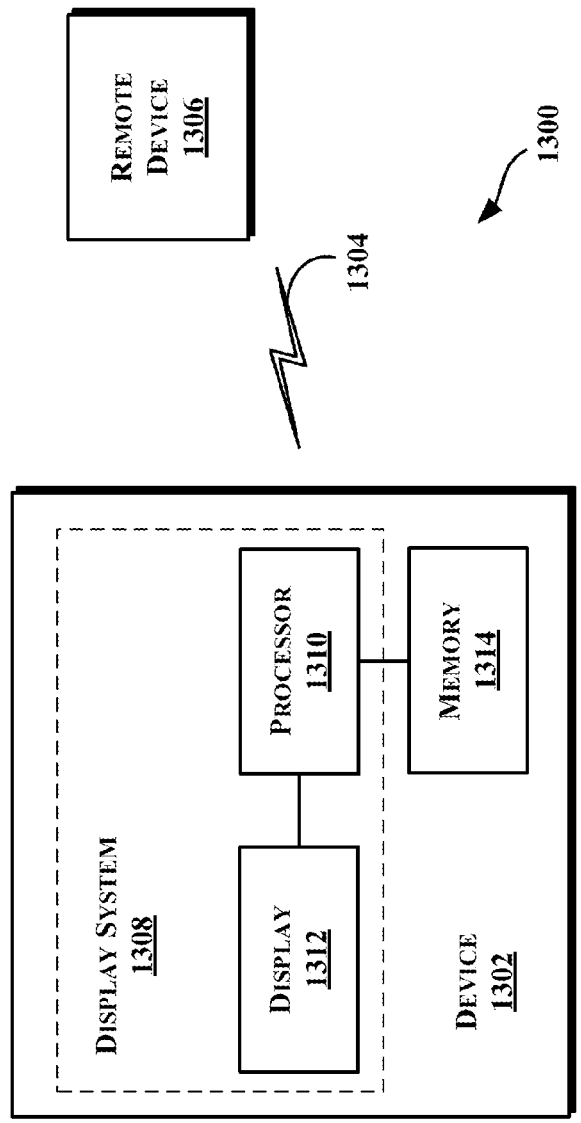
FIG. 13A shows a simplified block diagram of an example networked computing device.

FIG. 13A shows a simplified block diagram of an example networked computing device 1302. In one system 1300, a device 1302 communicates using a communication link 1304 (e.g., a wired or wireless connection) to a remote device 1306. The device 1302 may be any type of device that can receive data and display information corresponding to or associated with the data. For example, device 1302 may be a pen device, such as pen device 1202 shown in FIG. 12.

Thus, device 1302 may include display system 1308 comprising a processor 1310 and a display 1312. Display 1312 may be, for example, a graphic display. Processor 1310 may by any type of processor, such as a microprocessor or a digital signal processor, for example. Device 1302 may further include on-board data storage, such as memory 1314 coupled to processor 1310. Memory 1314 may store software that can be accessed and executed by processor 1310, for example.

Remote device 1306 may be any type of computing device or transmitter including a laptop computer, a mobile telephone, a network server, etc., that is configured to transmit data to device 1302. Remote device 1306 and device 1302 may contain hardware to enable communication link 1304, such as processors, transmitters, receivers, antennas, etc.

In FIG. 13A, communication link 1304 is illustrated as a wireless connection; however, wired connections may also be used. For example, communication link 1304 may be a wired link via a serial bus such as a universal serial bus or a parallel bus. Such a wired connection may be a proprietary connection as well. Communication link 1304 may also be a wireless connection that uses, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 1306 may be accessible via the Internet and may comprise a computing cluster associated with a particular web service (e.g., social-networking, photo sharing, address book, etc.).

Figure 13B:
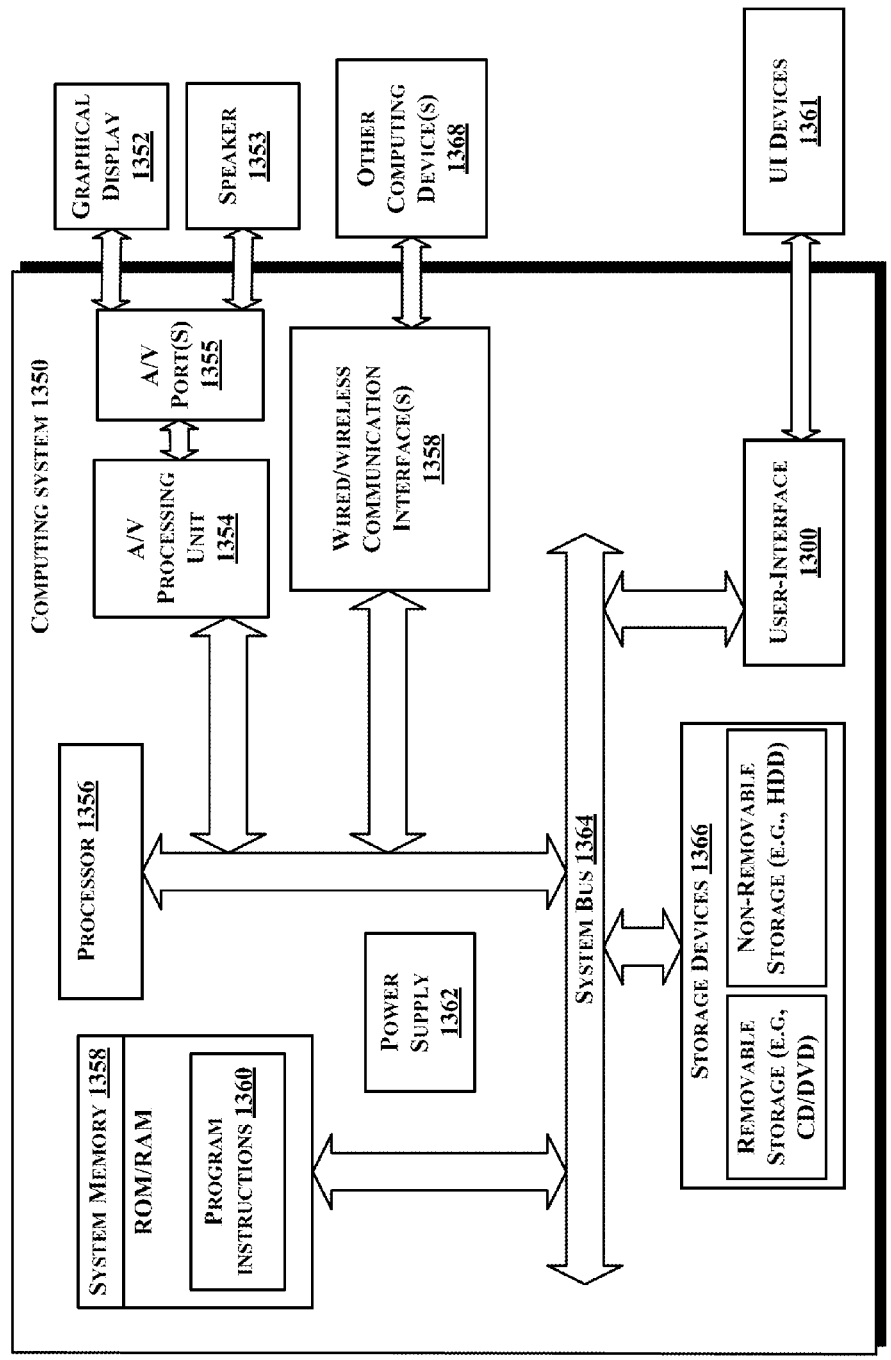
FIG. 13B shows a simplified block diagram depicting components of an example computing system.

Now, with reference again to FIGS. 11A-11B and 12, recall that example touch-based interface 1102 and/or pen device 1202 may include, or may otherwise be communicatively coupled to, a computing system such as computing system 1110 and computing system 1208, respectively. Such a computing system may take the form of example computing system 1350 as shown in FIG. 13B. Additionally, one, or each, of device 1302 and remote device 1306 may take the form of computing system 1350.

FIG. 13B shows a simplified block diagram depicting components of an example computing system 1350. Computing system 1350 may include at least one processor 1356 and system memory 1358. In an example embodiment, computing system 1350 may include a system bus 1364 that communicatively connects processor 1356 and system memory 1358, as well as other components of computing system 1350. Depending on the desired configuration, processor 1356 can be any type of processor including, but not limited to, a microprocessor (μP), a microcontroller (μC), a digital signal processor (DSP), or any combination thereof. Furthermore, system memory 1358 can be of any type of memory now known or later developed including but not limited to volatile memory (such as RAM), nonvolatile memory (such as ROM, flash memory, etc.) or any combination thereof.

An example computing system 1350 may include various other components as well. For example, computing system 1350 includes an A/V processing unit 1354 for controlling graphical display 1352 and speaker 1353 (via A/V port 1355), one or more communication interfaces 1358 for connecting to other computing devices 1368, and power supply 1362. Graphical display 1352 may be arranged to provide a visual depiction of various input regions provided by user-interface 1300. Note, also, that user-interface 1300 may be compatible with one or more additional user-interface devices 1361 as well.

Furthermore, computing system 1350 may also include one or more data storage devices 1366, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 1350.

According to an example embodiment, computing system 1350 may include program instructions that are stored in system memory 1358 (and/or possibly in another data-storage medium) and executable by processor 1356 to facilitate the various functions described herein including, but not limited to, those functions described with respect to FIGS. 14A-14B, 15, 16, and 17A-17B. Although various components of computing system 1350 are shown as distributed components, it should be understood that any of such components may be physically integrated and/or distributed according to the desired configuration of the computing system.

6. EXEMPLARY METHOD

Figure 14A:
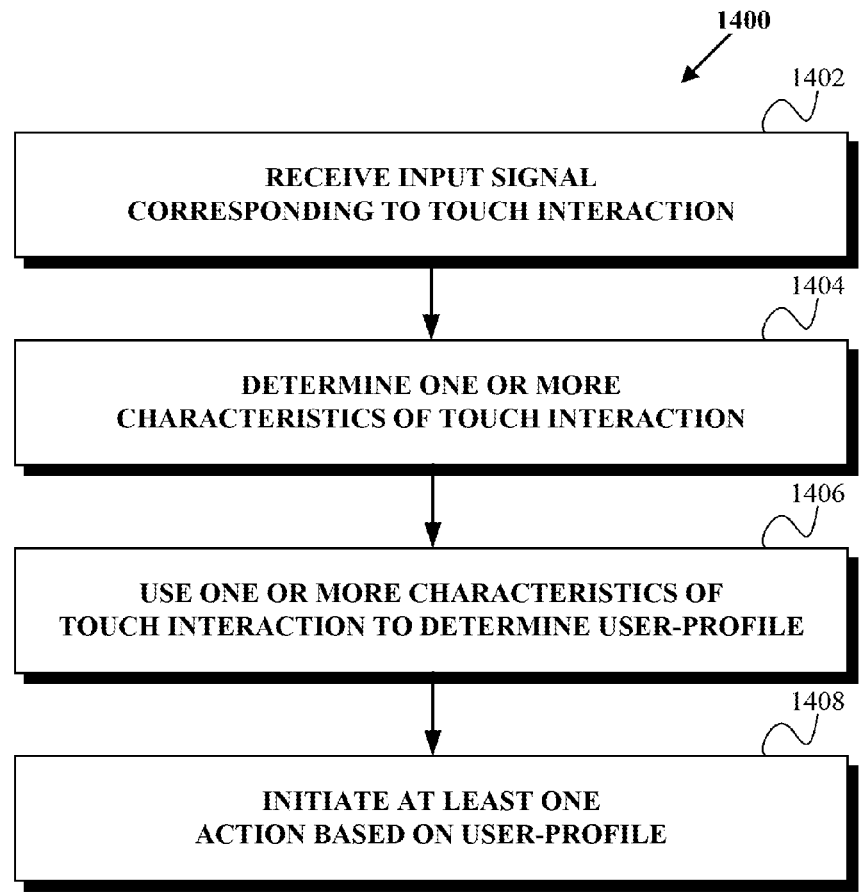
FIG. 14A shows a flowchart depicting a method for user-specific customization based on characteristics of touch interaction, according to an exemplary embodiment.

FIG. 14A shows a flowchart depicting a method 1400 for user-specific customization based on touch interaction, according to an exemplary embodiment. Aspects of example method 1400 may be carried out by any suitable computing system, or any suitable components thereof. Further, method 1400 illustrates an embodiment in which a certain user-profile is identified based on characteristics of a user's interaction with a touch-based interface, which may include at least one behavioral characteristic.

More specifically, method 1400 begins at block 1402, where the computing system receives an input signal corresponding to a touch interaction on a touch-based interface. At block 1404, the computing system determines, based at least in part on the input signal, one or more characteristics of the touch interaction, where the one or more characteristics of the touch interaction include at least one behavioral characteristic of the touch interaction. At block 1406, the computing system uses the one or more characteristics of the touch interaction as a basis for determining a user-profile. And at block 1408, the computing system initiates at least one action based on the determined user-profile. Each of the blocks shown with respect to FIG. 14A is discussed further below.

a. Receive Input Signal Corresponding to Touch Interaction

The input signal corresponding to the touch interaction received at block 1402 may take various forms. For example, in some embodiments, the touch interaction may be associated with a finger touch. That is, a user may input data on the touch-based interface using a gesture of a finger (or multiple fingers). As another example, the touch interaction may be associated with a pen device. That is, a user may input data on the touch-based interface by writing or tapping using the pen device.

Further, in some instances, the touch interaction may provide content that includes a text segment. That is, regardless of the type of touch interaction (e.g., either finger or pen device), the user may input a text segment on the touch-based interface. Further, the text segment may include characters, numbers, words, phrases and/or sentences, among other examples. Additionally, the text segment may take the form of handwritten text or typed text. And, as will be discussed further below, a text segment may have a semantic characteristic or characteristics, such as a vocabulary and/or a grammar characteristic, which may provide additional information that can be used to determine a particular user-profile that corresponds to the touch interaction.

The first touch interaction and the second touch interaction may alternatively, or additionally, take any other form described herein.

b. Determine One or More Characteristics of Touch Interaction

The one or more characteristics of the touch interaction, which are determined at block 1404, may include various types of characteristics. In general, the determined characteristic or characteristics of the touch interaction may be any suitable aspect, part of, or distinguishing feature of the way in which a user interacts with the touch-based interface that helps distinguish one user from another, and/or that helps distinguish one type of user from another.

As specified in block 1404, the determined characteristics include at least one behavioral characteristic of the touch interaction. In general, a "behavioral characteristic" is a characteristic of the way in which the user interacts with an interface. For example, the at least one behavioral characteristic of the touch interaction in block 1404 may include one or more of: (a) a measure of pressure associated with the touch interaction, (b) a measure of jitter associated with the touch interaction, (c) one or more handwriting characteristics associated with the touch interaction, (d) a speed associated with the touch interaction, and (e) a touch pattern associated with the touch interaction. Other examples of behavioral characteristics may exist as well.

Such behavioral characteristics of a given touch interaction may help to identify a particular user-profile due to natural variation between users in the way input is provided. In particular, because physiological and/or cognitive differences between users may affect the way different users provide the same input, behavioral characteristics may help to distinguish one user from another, and/or help to distinguish one type of user from another.

As a specific example, if two different users write the word "dog" on a touchscreen interface, the content provided by the interaction is the same in both cases. However, the way in which the users interact while writing the word "dog" may differ significantly. For example, if the word "dog" is handwritten, the characteristics of the handwriting may differ (e.g., the size of letters, the shape of letters, the spacing between letters, the relative angles and sizes of lines and arcs forming the letters, etc.). Furthermore, other characteristics may vary between users such as the speed with which the word "dog" is written, the pressure applied to the touchscreen interface while the word "dog" is being written, and/or the jitter of the stylus or finger while the word "dog" is being written, among others. As such, by identifying the characteristics that are associated with a certain user or type of user, an exemplary computing system may use the specific characteristics of a given interaction to help identify a user-profile that corresponds to the specific characteristics.

In a further aspect, determining the one or more characteristics of the touch interaction may include determining that the touch interaction is associated with either a finger touch or a pen device such as a stylus. This information may help to determine a user-profile as a particular user or a particular type of user may, for example, use a stylus to interact via a touchscreen interface more frequently than their finger (or vice versa).

In some embodiments, a computing device may determine that a certain touch interaction is associated with a pen device by receiving an identifier of the pen device. For instance, at or near the time a computing device detects a certain touch interaction, the computing device may receive a radio-frequency identification (RFID) tag contained in the pen device.

In some embodiments, a pen identifier such as an RFID tag may be used in conjunction with one or more behavioral characteristics of the touch interaction, in order to determine the user-profile. It should be noted that although reference is made herein to an RFID tag, any suitable near-field communication (NFC) technology may be used as well or instead.

In some embodiments, a computing device may use certain biometric characteristics associated with a finger-based touch interaction to determine a user-profile. For example, the computing device may analyze a fingerprint on the touch-based interface that is acquired when the touch interaction is received. As another example, the computing device may determine a finger size, such as by determining an area or region of contact between a finger and the touch-based interface. Further, a device may determine and use galvanic skin response (GSR), by measuring the electrical conductivity between two points on the skin during a finger-based touch interaction.

Furthermore, in some embodiments, a computing device may be configured with specialized lights on the surface of a touch-based interface, and specialized sensors that allow the computing device to carry out a pulse oximetry (PulseOx) function. In particular, scenarios may exist where there is enough "bounce back" of light projected into a finger, that a sensor configured to detect the light that bounces back can determine information that can be used to derive data such as oxygen saturation of the user, the heart rate of a user, beat-to-beat variability of a heart rate, etc. Such biometric data may be used as a "fingerprint" for a person, and thus may be used in some scenarios to determine a user-profile for a particular individual.

In some embodiments, a computing device may determine a characteristic or characteristics of the content that is provided by a given touch interaction, and use the characteristic(s) of the content as a further basis for determining the user-profile. For example, if the touch interaction provides content that includes a text segment, the characteristics of the content may include semantic characteristic(s) of the text segment. Such semantic characteristic(s) may include a characteristic or characteristics of the vocabulary and grammar of the text segment. As a specific example, if a given touch interaction provides text including the word "dawg," as opposed to the word "dog," this may indicate that a user-profile for a less-formal environment should be selected (e.g., a "non-work" user profile). Other examples of semantic characteristics may exist as well.

c. Use One or More Characteristics of Touch Interaction to Determine User-Profile At block 1406, the computing system uses the one or more characteristics of the touch interaction as a basis for determining a user-profile. The determined user-profile may be a user-profile for a particular user (i.e., for a particular individual) or a user-profile for a particular category of user (e.g., type of user).

An exemplary embodiment may involve a user-profile for various different user-categories. For instance, such user-categories may include one or more of (a) an age-range category, (b) an occupation category, (c) a profession category, (d) a status category (e) a personal-interest category (f) a state-of-being category (g) an intelligence category (h) an authority category (i) a gender category, and (j) a computing-competence category. Many other examples of user-categories are also possible.

Further, in some embodiments, the determined user-profile may be a user-profile for a particular user in association with that user acting as a particular type of user. For example, a computing system may determine that a certain touch interaction, or combination of touch interactions, corresponds to a user-profile for "Jane Smith" acting as a "physicist." This user-profile may include settings that are specific to "Jane Smith," and may have additional settings, and/or may modify some settings of a default "Jane Smith" user-profile, according to a user-type profile for "physicist."

d. Use of Context as a Further Basis to Determine a User-Profile

In a further aspect, an exemplary method may advantageously make use of context information to help determine which user-profile corresponds to a particular touch interaction. For example, a computing device may determine the current location at the time it detects a certain touch interaction, and then determine that a particular user's residence is at or near the current location. This may be interpreted as an indication that a user-profile associated with the particular user should be selected as the user-profile corresponding to a certain touch interaction.

In an exemplary embodiment, context information may be determined by one or more sensors of a touch-based interface and/or one or more alternative computing systems associated with the touch-based interface and/or by a pen device used to input data via the touch-based interface. Ultimately, the context information, and in particular, the current context, may be used as a further basis to determine the user-profile.

In some embodiments, context information may be used to help increase certainty that the correct user-profile has been determined based on the characteristics of the touch interaction. For example, if a user-profile for "Jane Smith" is selected, and the current location is determined to be at or near Jane Smith's residence (or at or near another location that is in some way associated with Jane Smith), this may increase the certainty that the user-profile for "Jane Smith" was correctly selected. Alternatively, if a user-profile for "Jane Smith, physicist" is selected, and the current location is determined to be at or near Jane Smith's workplace (or at or near another location that is in some way associated with Jane Smith's work as a physicist), this may increase the certainty that the user-profile for "Jane Smith" was correctly selected.

Further, in some embodiments, context information may be used to help disambiguate between user-profiles. For example, if a certain touch interaction has characteristics that substantially match a number of user-profiles, it may be difficult to determine a user-profile based on the characteristics of the touch interaction alone. In such a scenario, an exemplary computing system may utilize other types of information, such as context information, to disambiguate between user-profiles.

As a specific example, assume that a first user typically uses a computing system during a first period of the day, while a second user may use the same computing system during a second period of the day. For instance, a stay-at-home father may typically use the computing system during the day, while a working mother may typically use the computing system at night. In this scenario, if the computing system is unable to distinguish between the first user and the second user (e.g., the mother and the father) based on behavioral characteristics of the users' touch interactions, the computing system may use time-of-day information to help determine a user-profile. For example, if it is 3:00 in the afternoon, then the system may determine the user-profile to be a user-profile for the stay-at-home father, rather than the user-profile for the working mother. Many other examples are also possible.

In an exemplary embodiment, context may be determined by evaluating context signals, which may be acquired or determined based on data from various sources. For instance, context-information sources may include various systems and sensors of the computing device. These sensors and/or systems may be included as part of, or may be communicatively coupled to, one of a computing system associated with the touch-based interface and/or a pen device. Examples of such sensors and systems include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, a digital camera, a system clock providing a reference for time-based context signals, and/or a location-determination system (e.g., GPS), among others.

In a further aspect, context signals may be obtained or determined from network-based data sources, such as network-based weather-report feeds, news feeds, financial-market feeds, a system clock providing a reference for time-based context signals, and/or a location-determination system (e.g., GPS), among others.

Many types of information, from many different sources, may be used as context signals or provide information from which context signals may be determined. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location. Those skilled in the art will understand that the above list of possible context signals and sources of context information is not intended to be limiting, and that other context signals and/or sources of context information are possible in addition, or in the alternative, to those listed above.

In a further aspect, a "context" may be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

e. Initiate an Action Based on the Determined User-Profile

Referring again to FIG. 14A, at block 1408, the computing system may initiate a number of different actions based on the user-profile, depending upon the particular implementation and/or the particular situation.

In some embodiments, the computing system may adjust at least one user-interface feature based on at least one user-interface setting indicated by the user-profile. For example, upon determining the user profile, a user-interface setting of the touch-based interface may be adjusted according to, for instance, a preferred setting indicated by the user profile. Such settings of the touch-based interface may include for example, sensitivity, responsiveness, brightness, and/or contrast, among others.

In some embodiments, the computing system may adjust the appearance of a user-interface or user-interfaces according to the determined user-profile. For example, the computing system may update visual features of a graphic user-interface such as (a) font, (b) text size, and/or (c) user-interface layout, among others.

In a further aspect, the computing system may initiate an action to update user-interface settings and/or other types of settings for a specific application or applications. Such application settings may include one or more of: (a) font, (b) text size, (c) volume, (d) touch-based interface sensitivity, (e) user-interface layout, (f) content presented, (g) pacing of user-interface change and/or (h) pacing of content change, among others.

Additionally or alternatively, the computing system may initiate an action to update user-interface settings and/or other types of settings on a system-wide basis. Such system settings may include one or more of: (a) font, (b) text size, (c) volume, (d) touch-based interface sensitivity, (e) user-interface layout, (f) content presented, (g) pacing of user-interface change and/or (h) pacing of content change, among others.

In a further aspect, a computing system may initiate an action to adjust a tactile-feedback configuration of the touch-based interface based on at least one tactile-feedback setting indicated by the determined user-profile. For instance, the computing system may adjust a setting that affects electrostatic forces created by the touch-based interface in response to touch interaction. Further, the computing system may make such an adjustment on an application-by-application basis, or a system-wide basis. Other techniques for adjusting the tactile-feedback configuration may exist as well.

As yet another example, a computing system may initiate an action to provide feedback via a pen device that was used for the touch interaction. For instance, the computing system may send a feedback message to the pen device. The feedback message may instruct the pen device to provide feedback based on the touch interaction and the determined user-profile. Such feedback may include vibration of the pen device, perhaps by a haptic element or more generally, by a motor that vibrates the pen device. Further, in some embodiments, certain vibration patterns may correspond to certain types of feedback. For example, a long vibration may indicate an error in the input from the pen device, while one or two short vibrations may indicate that input was correctly provided. Other examples are also possible.

Alternatively, or additionally, the computing system may send the pen device a feedback message that indicates a feedback message for display on a graphic display of the pen device. Other examples of feedback at the pen device may exist as well.

Further, the computing system may communicate a feedback message to the pen device in various ways. For example, the computing system may communicate with the pen device wirelessly using WiFi, Bluetooth, or other another wireless communication protocol and/or near-field communication (NFC) technique. It is also possible that the computing system may communicate with the pen device via a wired connection.

As an additional example of an action initiated based on a user-profile for a user-category, consider the scenario where the determined user-profile is for a particular age-range category from a set of possible age-range categories. In this scenario, the initiated action may involve an adjustment, based on the particular age-range category, to one or more of: (a) font, (b) text size, (c) volume, (d) touch-based interface sensitivity, (e) user-interface layout, (f) content presented, (g) pacing of user-interface change and/or (h) pacing of content change, among others.

For instance, if a user-profile for a thirteen-to-fifteen year old is implemented, then the volume for a music application (and possibly system-wide) may be set at a high volume by default, based on an assumption that teenagers generally like to listen to loud music. Furthermore, one or more error-correction settings indicated by the thirteen-to-fifteen year old user-profile may be implemented as well. For example, certain slang or colloquialisms that are popular among teenagers may be ignored by a spellchecker. For instance, a spellchecker might ignore phrases such as "LOL," which it otherwise might flag as a typographical error. Other examples of settings that could be adjusted according to the user-profile for a teenage age group are also possible.

On the other hand, if a user-profile for a thirty-to-thirty-five year old is implemented, then the volume for a music application (and possibly system-wide) may be set at a lower level relative to the thirteen-to-fifteen year old user-profile. Further, a different error-correction profile, appropriate for thirty to thirty-five year olds could be implemented.

As another specific example, if a user-profile for over eighty-five years old is implemented, then the volume for all applications may be set at a higher volume than it would be for a younger age group, in order to assist elderly users who may have experienced some amount of hearing loss. Further, the font size may be set to a larger size than it would be for a younger age group, in order to assist elderly users who may have difficulty seeing text displayed in a smaller font. Many other examples are also possible.

In some embodiments, the computing system may be configured to initiate an action that uses the content provided by the interaction, according to the settings of the determined user-profile. For example, the computing system may determine an e-mail account associated with the determined user-profile. Such an e-mail account may be stored locally, or non-locally, as part of the user-profile. Alternatively, the e-mail account may be looked-up by the computing system based on some other information (perhaps a name, website address, or other user characteristic) stored as part of the user-profile.

The computing system may then send an e-mail message to the associated e-mail account. Such an e-mail message may include the content that is provided by the touch interaction. For instance, the e-mail message may include text that is written on the touch-based interface, or other media, such as a picture, that is selected via the touch interaction. Further, the e-mail message may include other content as indicated by the determined user-profile.

In an alternative embodiment, the computing system may send an e-mail message that does not include the content provided via the touch interaction, and instead includes other content as indicated by the determined user-profile. For instance, the user-profile may indicate that when text is entered that relates to a certain subject, articles or documents relating to that subject should be e-mailed to an e-mail account indicated by the user-profile. As an example, if the determined user-profile is for the user-category "lawyer," and the user interaction provides text including a particular statute or a name of a particular case, then the user-profile may indicate to send an e-mail with the full text of the particular statute (or a link thereto) or the full text particular case (or a link thereto). Many other examples are also possible.

Some embodiments may involve determining a current context and using the current context as a further basis for initiating an action. For instance, assume that, based on a given touch interaction, the computing system has identified that the user is a particular individual. In accordance with an embodiment, that individual may be associated with multiple user profiles and the computing system may be configured to select one of such multiple profiles based on a current context. For example, if an individual is associated with a first "daytime profile" and a second "evening profile" if a context signal indicates that it is 9 AM, the computing system may determine that the individual's "daytime profile" should be implemented. However, if a context signal indicates that it is 9 PM, the computing system may determine that the individual's "evening profile" should be implemented. The current context may be determined in any manner described herein. Also, the current context may be any of those contexts described herein.

In some embodiments, a computing system may be configured to interpret a touch interaction on a touch-based interface, which increases from a below a threshold pressure level to above a threshold pressure level, as a specific instruction that differs from a standard touch. For example, the computing system may interpret the former in a similar manner to a double click of a mouse, and the latter in a similar manner to a single click of a mouse. Other examples are also possible. In such an embodiment, the manner in which increasing-pressure touch interactions are interpreted may be adjusted according to the determined user-profile.

Figure 14B:
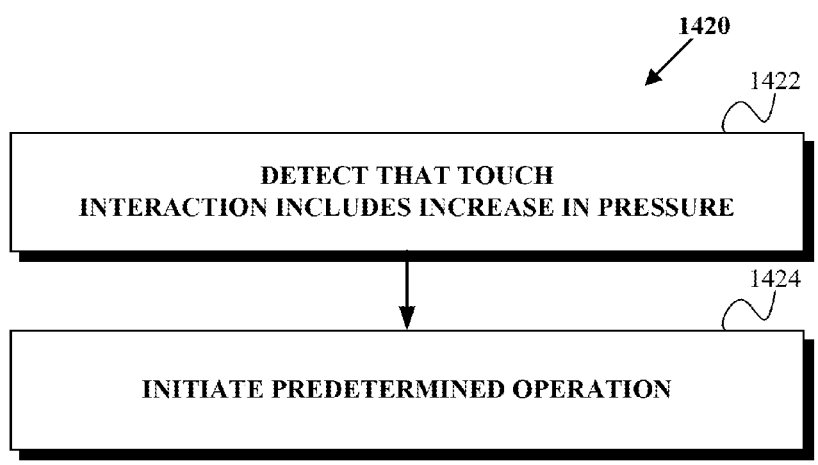
FIG. 14B shows a flowchart depicting a method for detecting and acting upon an increasing-pressure touch interaction, according to an exemplary embodiment.

In particular, with reference now to FIG. 14B, method 1420 shows an example of a computing system detecting and acting upon an increasing-pressure touch interaction. At block 1422, the computing system detects, at least, that the touch interaction includes an increase in pressure. Then, at block 1424, the computing system initiates a predetermined operation.

More specifically, in accordance with block 1422, the computing system may detect, based on the input signal, that the touch interaction includes an increase in pressure from a first pressure range to a second pressure range. The computing system may further detect that the increase to the second pressure range is followed by a reduction in pressure from the second pressure range to a third pressure range, which is below the first pressure range (e.g., that results from the user lifting their finger or a stylus off of the touch-based interface).

Then, in accordance with block 1424, the computing system may responsively initiate a predetermined operation based on a region of the touch-based interface that corresponds to the touch interaction (e.g., an operation such as that which is typically mapped to a "double-click" of a mouse).

Further, in some embodiments, it is possible that the predetermined operation may be initiated in response to the increase in pressure, without waiting for a subsequent decrease (e.g., without waiting for the user to lift their finger or the stylus from the touch-based interface).

In some embodiments, in accordance with block 1422, the computing system may detect, based on the input signal, that the touch interaction includes an increase in pressure by at least a predetermined percentage followed by a reduction in pressure to below an initial pressure level. Then, in accordance with block 1424, the computing system may responsively initiate a predetermined operation based on a region of the touch-based interface that corresponds to the given touch interaction.

In any embodiment where a computing system is configured to interpret increasing-pressure touch interactions, the computing system may accordingly initiate an action to adjust one or more settings related to increasing-pressure touch interactions based on the determined user-profile. For example, the computing system may adjust the first pressure range, the second pressure range, and/or the third pressure range as indicated by the user-profile. In some embodiments, this may be accomplished by adjusting the threshold or the thresholds that define the pressure ranges. As another example, the computing system may adjust the predetermined percentage by which the pressure level must increase and/or decrease in order for a touch interaction to be interpreted as an increasing-pressure touch interaction. Other settings of increasing-pressure touch interactions may be adjusted as well.

In a further aspect, the action that is initiated based on the determined user-profile may be further based on context information. For example, the computing system may determine a current context, and use the current context as a further basis for initiating at least one action. In particular, the user-profile may define a context-to-action mapping that specifies certain actions that should be performed in certain contexts. This context-to-action mapping will be described in greater detail later, with reference to FIGS. 17A and 17B.

It should be understood that the above examples of various actions that may be initiated based on the determined user-profile, may apply equally to examples involving a user-profile for a particular individual and examples involving a user-profile for a user-category. Further, unless there is some reasons that a certain action based on an individual's user-profile would be impracticable based on a user-category user-profile, or vice versa, any action described as being initiated based on a determined user profile should be understood to apply equally when the determined user-profile is for an individual or is for a user-category (or a combination thereof). Furthermore, it should be understood that the examples of actions that can be inititiated described herein are provided for illustrative purposes, and are not intended to be limiting. Many other actions can also be initiated according to the determined user-profile.

7. DETERMINING A USER PROFILE BASED ON CONTENT OF A TOUCH INTERACTION

As noted above, in some embodiments, one or more characteristics of textual input from a touch interaction may be used in conjunction with characteristics of the touch interaction itself, to determine a particular user-profile. In other embodiments, one or more characteristics of textual input or other content provided via a touch interaction may be used to determine a particular user-profile, without necessarily considering characteristics of the touch interaction itself. For example, certain grammar and/or vocabulary of input from a touch interaction may be used to identify a user-profile for a particular user or a particular type of user.

Figure 15:
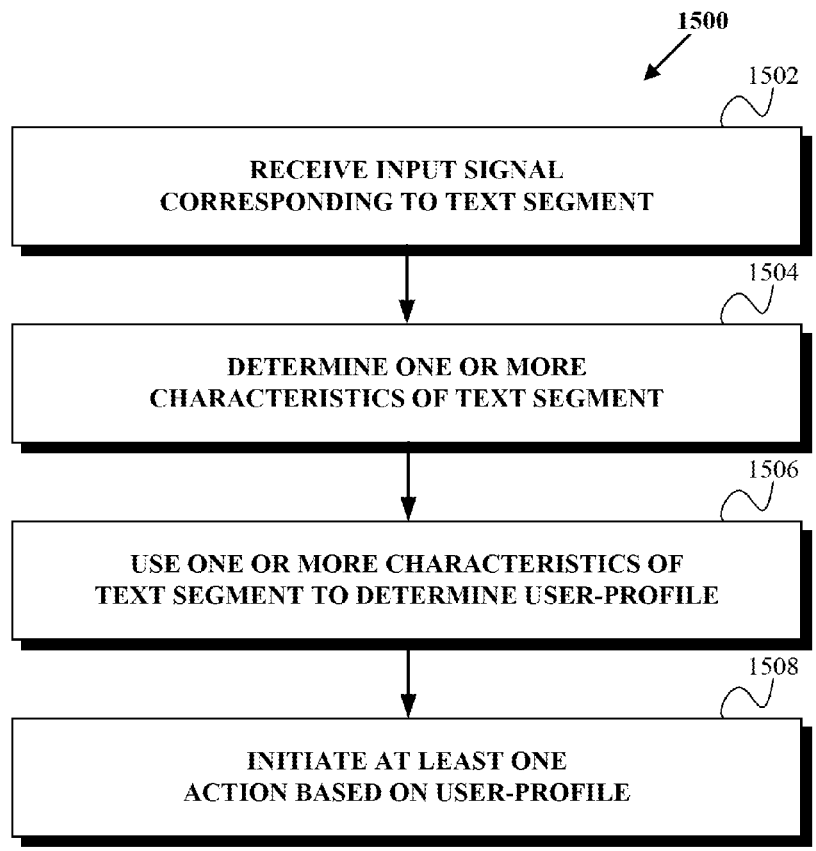
FIG. 15 shows a flowchart depicting another method for user-specific customization based on touch interaction, according to an exemplary embodiment.

FIG. 15 shows a flowchart depicting another method for user-specific customization based on touch interaction, according to an exemplary embodiment. In particular, method 1500 illustrates an embodiment in which semantic characteristics of content provided via a touch interaction are used to determine a user-profile, without necessarily relying on behavioral characteristics of the touch interaction itself. Aspects of example method 1500 may be carried out by any suitable computing system, or any suitable components thereof.

Example method 1500 begins at block 1502, where the computing system receives an input signal corresponding to a touch interaction on a touch-based interface, wherein the touch interaction corresponds to a text segment. At block 1504, the computing system determines, based at least in part on the input signal, one or more characteristics of the text segment, where the one or more characteristics of the text segment comprise at least one semantic characteristic of the text segment. At block 1506, the computing system uses the one or more characteristics of the text segment as a basis to determine a particular user-profile. And at block 1508, the computing system initiates at least one action based on the particular user-profile.

In method 1500, the touch interaction may correspond to a text segment, regardless of the type of touch interaction (e.g., via finger or pen device). Further, the text segment may be a set of characters, numbers, text, words, and/or sentences, among other examples. Further still, such a text segment may be associated with a semantic characteristic such as a vocabulary and/or grammar characteristic. For example, the at least one semantic characteristic of the text segment may include at least one characteristic indicative of variation in vocabulary between individual users and/or between particular types, classes, or groups of users.

8. DETERMINING A USER-PROFILE BASED ON THE CHARACTERISTICS OF A GESTURE

In some embodiments, a user-profile may be determined based on characteristics of a gesture, which may not necessarily be carried out on a touch-based interface. For example, a gesture may be carried out by writing on a surface such as a piece of paper or by performing certain predetermined motions in the air.

Figure 16:
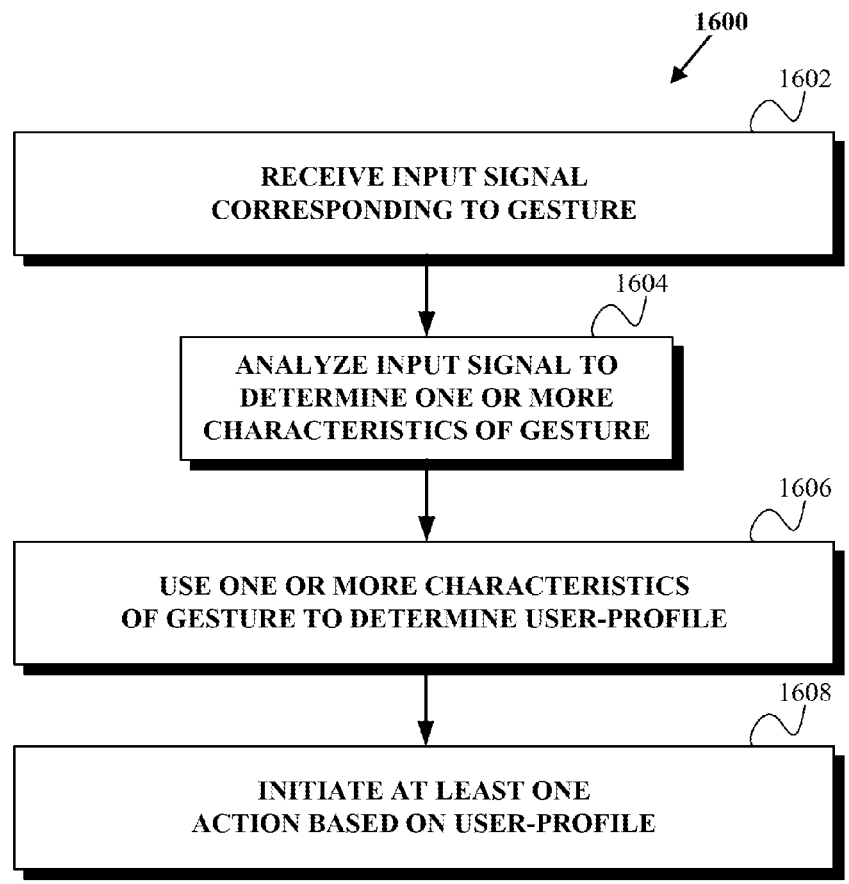
FIG. 16 shows a flowchart depicting a method for user-specific customization based on characteristics of a gesture, according to an exemplary embodiment.

FIG. 16 shows a flowchart depicting a method for user-specific customization based on characteristics of a gesture, according to an exemplary embodiment. Aspects of example method 1600 may be carried out by any suitable computing system, or any suitable components thereof.

Example method 1600 begins at block 1602, where the computing system receives an input signal corresponding to a gesture. The gesture may be made on a surface or, in some embodiments, may be a mid-air gesture. At block 1604, the computing system analyzes the at least one input signal to determine one or more characteristics of the gesture. These characteristics include at least one behavioral characteristics of the gesture. At block 1606, the computing system uses the one or more characteristics of the gesture as a basis to determine a user-profile. And at block 1608, the computing system initiates at least one action based on the determined user-profile.

When the input signal corresponds to a gesture on a surface, the type of surface may vary. For example, the gesture may be made on a piece of paper or on a touch-based interface. In any case, the gesture on a surface may be converted to an input signal in any suitable manner. As one example, the input signal may include data corresponding to one or more surface audio waves that correspond to the gesture. As another example, the input signal may include data corresponding to one or more videos of the gesture from one or more video cameras. Other examples are also possible.

At block 1604, the computing system may analyze the at least one input signal in any manner so as to ultimately determine one or more characteristics of the gesture that may be used to select a particular user-profile. This analysis may vary based on the type of gesture and/or the type of input signal.

The user profile determined by the computing system in accordance with block 1606 may be determined similar to the determination described above with respect to block 1406 of method 1400. Further, the action initiated by the computing system in accordance with block 1608 may be similar to those actions described above with respect to block 1408 of method 1400.

9. CONTEXT-SPECIFIC ACTIONS INDICATED BY A USER PROFILE

In some embodiments, a computing device may be configured to provide context-dependent actions to a particular user or a particular type of user. In particular, once a user-profile has been determined based on characteristics of a touch interaction, the computing device may use a context-to-action mapping specified by the user-profile to determine what action should be initiated.

a. Using Context to Initiate an Action for a Determined User-Profile

Figure 17A:
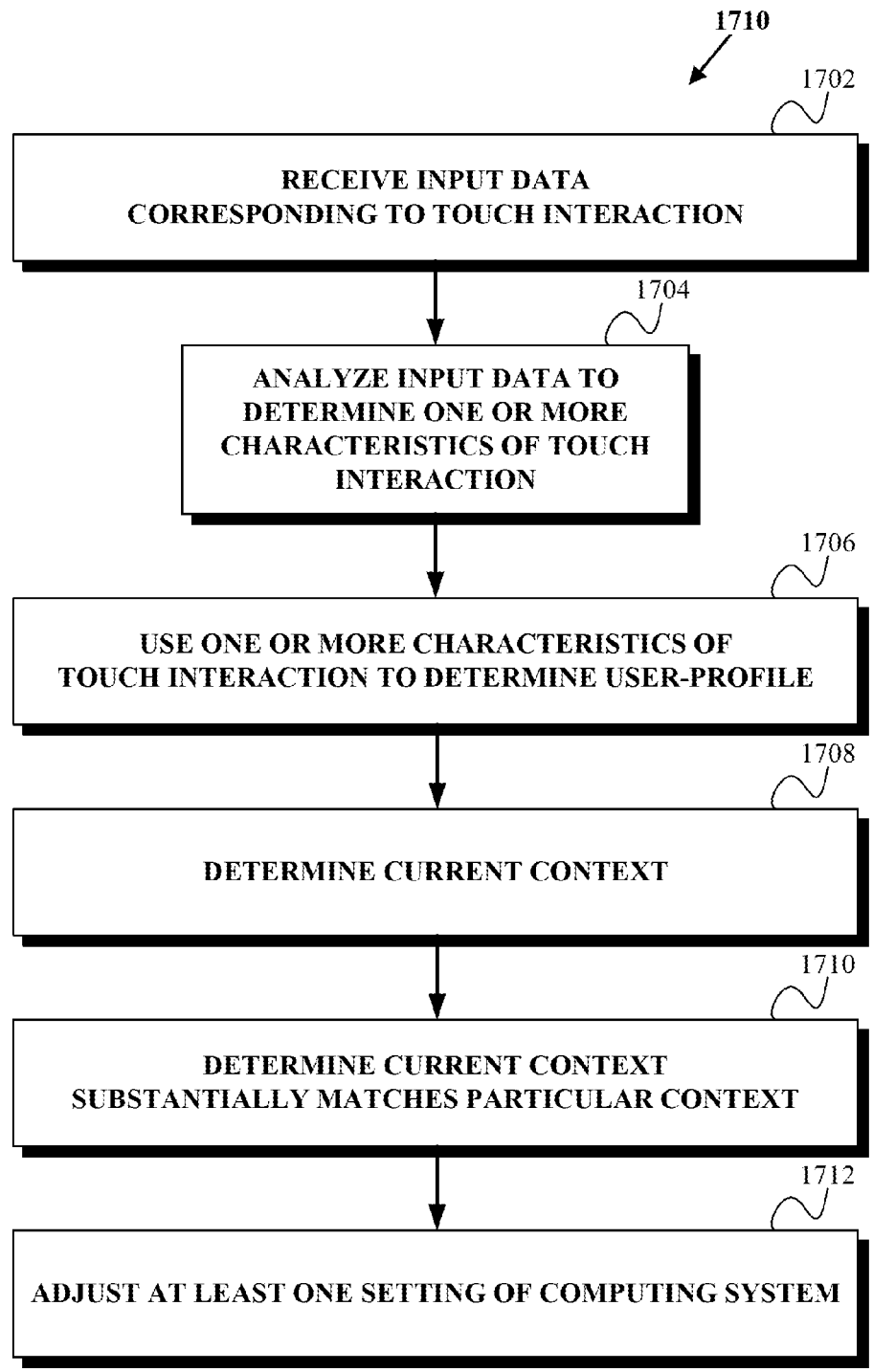
FIG. 17A shows a flowchart illustrating an exemplary method for user-specific customization based on touch interaction, in which the user-specific customization is further based on context information.

FIG. 17A is a flowchart illustrating an exemplary method for user-specific customization based on touch interaction, in which the user-specific customization is further based on context information. More specifically, in method 1700, block 1702 through 1706 may be carried out similarly to blocks 1402 through 1406 of method 1400. Then, at block 1708, the computing system determines the current context. The current context determined by the computing system in accordance with block 1708 may be determined similar to the determination described above with respect to block 1406 of method 1400. (Note, however, that in method 1700, the current context may or may not be used to determine the particular user-profile.)

Next, at block 1710, the computing system determines that the current context substantially matches the particular context indicated by the user-profile rule. Then, at block 1712, the computing system responsively adjusts the at least one setting of the computing system to the particular value indicated by the user-profile rule.

At block 1710, computing system may be configured to recognize that the current context is either exactly the same, or below a threshold-difference different, than the particular context. As one example, if the particular context is a temperature such as "80 degrees," a current context that substantially matches the particular context indicated by the user-profile rule may be any temperature from 75 degrees to 85 degrees. As another example, if the particular context is "afternoon," a current context that substantially matches the particular context indicated by the user-profile rule may be any time from 12 PM to 12 AM. Those of skill in the art will appreciate that other examples of a current context that substantially matches a particular context exist as well.

More generally, the user-profile rule may be one of any number of such rules included in a context-to-action mapping that is specified by the user-profile. For instance, a context-to-action mapping may map certain contexts, certain context signals, and/or certain combinations of context signals to corresponding actions. The context-to-action mapping may include simple rules that map a single context and/or a single context signal to a certain corresponding action, as well as more complex rules, which may indicate various actions that correspond to various combinations of contexts and/or context signals.

b. Learning Context-Specific Actions for a User-Profile

In some embodiments, a computing system may learn by observing actions that a user commonly initiates in certain contexts, and/or based on previous actions taken in certain contexts, that when a certain user-profile is active, certain actions should be taken in certain contexts. In such an embodiment, as the computing system correlates certain actions with certain contexts for a given user-profile, the computing system may update the context-to-action mapping for the user-profile accordingly.

Figure 17B:
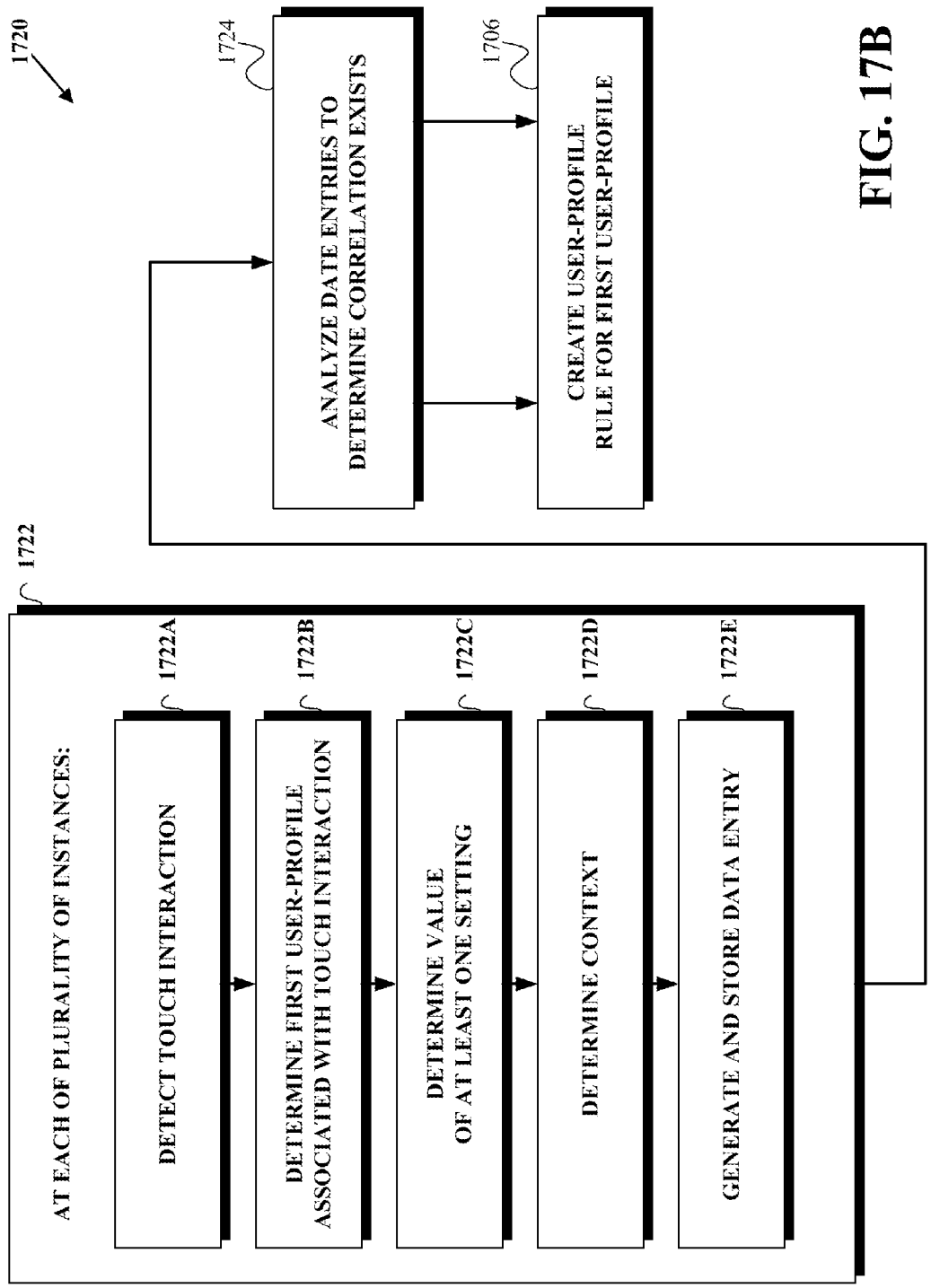
FIG. 17B shows a flowchart depicting a method for learning context-to-action mappings for a user-profile, according to an exemplary embodiment.

FIG. 17B shows a flowchart depicting a method for learning context-to-action mappings for a user-profile, according to an exemplary embodiment. Aspects of example method 1720 may be carried out by any suitable computing system, or any suitable components thereof.

Example method 1720 begins at step 1722, where the computing system, at each of a plurality of instances: (a) detects, at a computing device having a touch-based interface, a touch interaction on the touch-based interface, as shown by sub-block 1722A; (b) determines that a first user-profile is associated with the touch interaction, as shown by sub-block 1722B; (c) determines a value at the instance of at least one setting of the computing device, as shown by sub-block 1722C; (d) determines a context at the instance, as shown by sub-block 1722C; and (e) generates and stores a data entry for the instance, where the data entry is associated with the first user-profile and includes an indication of the value at the instance of the at least one setting of the computing device and an indication of the context at the instance, as shown by sub-block 1722E.

At block 1724, the computing system analyzes the data entries for the first user-profile to determine that a correlation exists between a particular value of at least one setting of the computing device and a particular context. And at block 1726, the computing system, responsive to determining that the correlation exists, creates a user-profile rule for the first user-profile that indicates an adjustment of the at least one setting to the particular value in response to detecting that a current context substantially matches the particular context. In particular, the computing system may update a context-to-action mapping for the user-profile with such a rule.

In order to determine that a correlation exists between a particular value of at least one setting of the computing device and a particular context, as shown by block 1724, the computing system may evaluate historical context data (which may be stored locally and/or non-locally) and determine a correlation exists between a setting selected by the user, and a certain context. Additionally or alternatively, the computing system may be configured for an "on-the-fly" determination of whether a current context has historically been associated with certain settings. In particular, the computing system may compare a current context to historical context data, and determine whether certain settings have historically been correlated with the current context.

10. CONCLUSION

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

We claim:

1. A computer-implemented method comprising:
   receiving an input signal corresponding to a touch interaction on a touch-based interface;
   determining a geographic location of the touch-based interface at a time corresponding to the touch interaction;
   determining, based at least in part on the input signal, one or more characteristics of the touch interaction, wherein the one or more characteristics of the touch interaction comprise at least one behavioral characteristic of the touch interaction;
   determining that the one or more characteristics of the touch interaction match to a plurality of potential user-profiles from a set of user-profiles;
   in response to determining that the one or more characteristics of the touch interaction match to the plurality of potential user-profiles:
     (a) comparing the determined geographic location to location information indicated by the plurality of potential user-profiles, and
     (b) based at least on the comparison, selecting a particular user-profile from among the plurality of potential user-profiles; and
   initiating at least one action based on one or more of the following factors: (i) the particular user-profile, (ii) the touch interaction, and (iii) the determined geographic location.

2. The method of claim 1, wherein the touch interaction is associated with a finger touch.

3. The method of claim 2, wherein determining the one or more characteristics of the touch interaction comprises determining that the touch interaction is associated with a finger touch.

4. The method of claim 1, wherein the touch interaction is associated with a pen device.

5. The method of claim 4, wherein determining the one or more characteristics of the touch interaction comprises determining that the touch interaction is associated with a pen device.

6. The method of claim 5, wherein determining the one or more characteristics of the touch interaction further comprises receiving an identifier of the pen device.

7. The method of claim 6, wherein the identifier of the pen device comprises a radio-frequency identification (RFID) tag.

8. The method of claim 4, wherein initiating the at least one action comprises sending a command to the pen device, wherein the command instructs the pen device to provide feedback based on the touch interaction and the particular user-profile.

9. The method of claim 8, wherein the feedback based on the touch interaction and the particular user-profile comprises vibration of the pen device.

10. The method of claim 8, wherein the feedback based on the touch interaction and the particular user-profile comprises a feedback message for display on a graphic display of the pen device.

11. The method of claim 1, wherein the at least one behavioral characteristic comprises a characteristic of the touch interaction where natural variation results from physiological differences between users.

12. The method of claim 1, wherein the at least one behavioral characteristic comprises a characteristic of the touch interaction where natural variation results from cognitive differences between users.

13. The method of claim 1, wherein the at least one behavioral characteristic comprises one or more of: (a) a measure of pressure associated with the touch interaction, (b) a measure of jitter associated with the touch interaction, (c) one or more handwriting characteristics associated with the touch interaction, (d) a speed associated with the touch interaction, (e) a touch pattern associated with the touch interaction, (f) a fingerprint, (g) a size of a contact region of the touch interaction, (h) a galvanic skin response (GVR) measurement associated with the touch interaction, (i) a pulse measurement associated with the touch interaction, and (j) a pulse-oximetry measurement associated with the touch interaction.

14. The method of claim 1, wherein content provided by the touch interaction comprises a text segment, and wherein the one or more characteristics of the touch interaction further comprise at least one semantic characteristic of the text segment.

15. The method of claim 14, wherein the at least one semantic characteristic of the text segment comprises at least one characteristic indicative of one or more of (a) vocabulary and (b) grammar.

16. The method of claim 1, wherein the particular user-profile comprises an individual user-profile corresponding to a particular user.

17. The method of claim 1, wherein determining that the one or more characteristics of the touch interaction match to a plurality of potential user-profiles comprises:
using the one or more characteristics of the touch interaction as a basis for determining one or more user-categories; and
determining that each of the plurality of potential user-profiles corresponds to one or more of the determined one or more user-categories.

18. The method of claim 17, wherein the one or more user-categories comprise one or more of (a) an age-range category, (b) an occupation category, (c) a profession category, (d) a status category, (e) a personal-interest category, (f) a state-of-being category, (g) an intelligence category, (h) an authority category, (i) a gender category, (j) a computing-competence category, (k) a mood category, and/or (l) a security-clearance level category.

19. The method of claim 17, wherein the one or more user-categories comprise a particular age-range category from a set of possible age-range categories, and where the at least one action comprises an adjustment to one or more of the following based on the particular age-range category: (a) font, (b) text size, (c) volume, (d) touch-based interface sensitivity, (e) user-interface layout, (f) content presented, (g) pacing of user-interface change and (h) pacing of content change.

20. The method of claim 1, wherein the touch interaction corresponds to a text segment, and wherein initiating the at least one action comprises:
determining an e-mail account associated with the particular user-profile; and
sending an e-mail message to the associated e-mail account.

21. The method of claim 1, wherein initiating the at least one action comprises adjusting at least one user-interface feature based on at least one user-interface setting indicated by the particular user-profile.

22. The method of claim 1, wherein initiating the at least one action comprises adjusting to at least one application setting as indicated by the particular user-profile.

23. The method of claim 22, wherein the at least one application setting comprises one or more of the following: (a) font, (b) text size, (c) volume, (d) touch-based interface sensitivity, (e) user-interface layout, (f) content presented, (g) pacing of user-interface change and (h) pacing of content change.

24. The method of claim 1, wherein initiating the at least one action comprises adjusting at least one system setting as indicated by the particular user-profile.

25. The method of claim 24, wherein the at least one system setting comprises one or more of the following: (a) font, (b) text size, (c) volume, (d) touch-based interface sensitivity, (e) user-interface layout, (f) content presented, (g) pacing of user-interface change and (h) pacing of content change.

26. The method of claim 1, wherein initiating the at least one action comprises adjusting one or more error-correction settings as indicated by the particular user-profile.

27. The method of claim 1, wherein initiating the at least one action comprises adjusting a tactile-feedback configuration of the touch-based interface based on at least one tactile-feedback setting indicated by the particular user-profile.

28. The method of claim 27, wherein adjusting the tactile-feedback configuration of the touch-based interface comprises adjusting at least one setting that affects electrostatic forces created by the touch-based interface in response to touch interaction.

29. The method of claim 1, further comprising:
detecting, based on the input signal, that the touch interaction comprises an increase in pressure from a first pressure range to a second pressure range followed by a reduction in pressure from the second pressure range to a third pressure range below the first pressure range; and
responsively initiating a predetermined operation based on a region of the touch-based interface that corresponds to the touch interaction, wherein initiating the at least one action comprises adjusting at least one of the first pressure range, the second pressure range, and the third pressure range as indicated by the particular user-profile.

30. The method of claim 1, further comprising:
detecting, based on the input signal, that the touch interaction comprises an increase in pressure by at least a predetermined percentage followed by a reduction in pressure to below an initial pressure level; and responsively initiating a predetermined operation based on a region of the touch-based interface that corresponds to the given touch interaction, wherein initiating the at least one action comprises adjusting the predetermined percentage as indicated by the particular user-profile.

31. The method of claim 1, further comprising:
during the touch interaction, further determining a current context; and
further in response to determining that the one or more characteristics of the touch interaction match to the plurality of potential user-profiles, using the current context as a further basis to select the particular user-profile from among the plurality of potential user-profiles.

32. The method of claim 31, wherein the current context is determined based on one or more context signals, wherein the one or more context signals comprise one or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with the user-profile, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a device, (v) items that are currently detected by a device, (w) items that have been detected in the past by the device, (x) items that other devices associated with a device are currently in communication with or have communicated with in the past, (y) information derived from cross-referencing any two or more of: information on a user's calendar, information available via a user's social networking account, and/or other context signals or sources of context information, (z) health statistics or characterizations of a user's current health, (aa) a user's recent context as determined from sensors on or near the user and/or other sources of context information, (bb) a current location, (cc) a past location, and (dd) a future location, (ee) a galvanic skin response (GVR) measurement, (dd) a pulse measurement, and (ee) a pulse-oximetry measurement.

33. The method of claim 1, further comprising:
during the touch interaction, further determining a current context; and
using the current context as a further basis for initiating the at least one action.

34. The method of claim 33, wherein the current context is determined based on one or more context signals, wherein the one or more context signals comprise one or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with the user-profile, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a device, (v) items that are currently detected by a device, (w) items that have been detected in the past by the device, (x) items that other devices associated with a device are currently in communication with or have communicated with in the past, (y) information derived from cross-referencing any two or more of: information on a user's calendar, information available via a user's social networking account, and/or other context signals or sources of context information, (z) health statistics or characterizations of a user's current health, (aa) a user's recent context as determined from sensors on or near the user and/or other sources of context information, (bb) a current location, (cc) a past location, and (dd) a future location, (ee) a galvanic skin response (GVR) measurement, (dd) a pulse measurement, and (ee) a pulse-oximetry measurement.

35. A system comprising:
a non-transitory computer-readable medium; and
program instructions stored on the non-transitory computer-readable medium and executable by at least one processor to:
receive an input signal corresponding to a touch interaction on a touch-based interface;
determine a geographic location of the touch-based interface at a time corresponding to the touch interaction;
determine, based on the input signal, one or more characteristics of the touch interaction, wherein the one or more characteristics of the touch interaction comprise at least one behavioral characteristic of the touch interaction;
determine that the one or more characteristics of the touch interaction match to a plurality of potential user-profiles from a set of user-profiles;
in response to determining that the one or more characteristics of the touch interaction match to the plurality of potential user-profiles:
(a) compare the determined geographic location to location information indicated by the plurality of potential user-profiles, and
(b) based at least on the comparison, select a particular user-profile from among the plurality of potential user-profiles; and
initiate at least one action based on one or more of the following factors: (i) the particular user-profile, (ii) the touch interaction, and (iii) the determined geographic location.

36. The system of claim 35, wherein the at least one behavioral characteristic comprises a characteristic of natural variation in touch interaction resulting from physiological differences between users.

37. The system of claim 35, wherein the at least one behavioral characteristic comprises a characteristic of natural variation in touch interaction resulting from cognitive differences between users.

38. The system of claim 35, wherein the at least one behavioral characteristic comprises one or more of: (a) a measure of pressure associated with the touch interaction, (b) a measure of jitter associated with the touch interaction, (c) one or more handwriting characteristics associated with the touch interaction, (d) a speed associated with the touch interaction, and (e) a touch pattern associated with the touch interaction.

39. The system of claim 35, wherein the touch interaction is associated with a finger touch.

40. The system of claim 35, wherein the touch interaction is associated with a pen device.

41. The system of claim 35, wherein the touch interaction corresponds to a text segment, and wherein the one or more characteristics of the touch interaction further comprise at least one semantic characteristic of the text.

42. The system of claim 41, wherein the at least one semantic characteristic of the text segment comprises at least one characteristic indicative of one or more of (a) vocabulary and (b) grammar.

43. The system of claim 35, wherein the particular user-profile comprises an individual user-profile corresponding to a particular user.

44. The system of claim 35, wherein the particular user-profile corresponds to one or more user-categories.

45. The system of claim 44, wherein the one or more user-categories comprise one or more of the following: (a) an age-range category, (b) an occupation category, (c) an employer category, (d) a status category, (e) a personal-interest category, and (f) a state-of-being category (g) an intelligence category (h) an authority category (i) a gender category, and (j) a computing-competence category.

46. The system of claim 35, wherein the at least one action comprises an adjustment to at least one application setting as indicated by the particular user-profile.

47. The system of claim 35, wherein the at least one action comprises an adjustment to at least one system setting as indicated by the particular user-profile.

48. The system of claim 35, wherein the at least one action comprises an adjustment to one or more error-correction settings based on one or more error-correction setting indicated by the particular user-profile.

49. The system of claim 35, wherein the at least one action comprises an adjustment to at least one user-interface based on at least one user-interface setting indicated by the particular user-profile.

50. The system of claim 35:
wherein the system is configured to determine pressure of a given touch interaction, to detect a given touch interaction comprising an increase in pressure from a first pressure range to a second pressure range followed by a reduction in pressure from the second pressure range to a third pressure range below the first pressure range, and to responsively initiate a predetermined operation based on a region of the touch-based interface that corresponds to the given touch interaction; and
wherein the at least one action comprises an adjustment to at least one of the first pressure range, the second pressure range, and the third pressure range as indicated by the particular user-profile.

51. The system of claim 35:
wherein the system is configured to determine pressure of a given touch interaction, to detect a given touch interaction comprising an increase in pressure by at least a predetermined percentage followed by a reduction in pressure to below an initial pressure level, and to responsively initiate a predetermined operation based on a region of the touch-based interface that corresponds to the given touch interaction;
wherein the at least one action comprises an adjustment to the predetermined percentage as indicated by the particular user-profile.

* * * * *